(12) United States Patent
Moore et al.

(10) Patent No.: US 9,268,622 B2
(45) Date of Patent: Feb. 23, 2016

(54) MESSAGE-BASED MODEL VERIFICATION

(75) Inventors: Alan J. Moore, Devon (GB); Ebrahim Mehran Mestchian, Newton, MA (US)

(73) Assignee: THE MATHWORKS, INC., Natick, MA (US)

(*) Notice: Subject to any disclaimer, the term of this patent is extended or adjusted under 35 U.S.C. 154(b) by 143 days.

(21) Appl. No.: 13/117,859

(22) Filed: May 27, 2011

(65) Prior Publication Data

US 2011/0296436 A1 Dec. 1, 2011

Related U.S. Application Data

(60) Provisional application No. 61/349,401, filed on May 28, 2010.

(51) Int. Cl.
*G06F 9/54* (2006.01)
*G06F 9/44* (2006.01)

(52) U.S. Cl.
CPC . *G06F 9/546* (2013.01); *G06F 8/34* (2013.01)

(58) Field of Classification Search
CPC .................................. G06F 9/546; G06F 8/34
See application file for complete search history.

(56) References Cited

U.S. PATENT DOCUMENTS

| | | | |
|---|---|---|---|
| 5,317,746 A | 5/1994 | Watanabe | |
| 6,519,639 B1 | 2/2003 | Glasser et al. | |
| 7,313,449 B1 | 12/2007 | Ciolfi et al. | |
| 7,941,299 B1 | 5/2011 | Aldrich et al. | |
| 8,190,417 B2* | 5/2012 | Shachar | F41G 7/001 703/13 |
| 8,689,236 B2 | 4/2014 | Simsek et al. | |
| 2002/0013889 A1 | 1/2002 | Schuster et al. | |
| 2004/0230979 A1 | 11/2004 | Beecroft et al. | |
| 2005/0216248 A1* | 9/2005 | Ciolfi et al. | 703/22 |
| 2007/0288885 A1 | 12/2007 | Brunel et al. | |
| 2008/0098349 A1 | 4/2008 | Lin et al. | |
| 2009/0044171 A1 | 2/2009 | Avadhanula | |
| 2009/0132936 A1* | 5/2009 | Anderson et al. | 715/762 |
| 2009/0164558 A1 | 6/2009 | Hofmann | |

(Continued)

FOREIGN PATENT DOCUMENTS

GB 0521625.4 * 5/2007

OTHER PUBLICATIONS

Eckard Bringmann, Model-based testing of Automotive Systems, International Conference on Software Testing, verification and validation (ICST), 2008 pp. 1-9.*

(Continued)

*Primary Examiner* — Syed Roni
(74) *Attorney, Agent, or Firm* — Cesari and McKenna LLP; Michael R. Reinemann

(57) ABSTRACT

A system and method may generate executable block diagrams having blocks that run in accordance with message-based execution semantics. A message may include an input data payload that does not change over time, and the message may persist for only a determined time interval during execution of block diagram. A verification engine may provide one or more tools for evaluating and verifying operation of message-based blocks. The verification engine may support one or more verification blocks that may be added to the block diagram and associated with the diagram's message-based blocks. The verification blocks may capture and present messages exchanged among the message-based blocks. The verification blocks may also specify an expected interaction of messages, and determine whether the actual messages are equivalent to the expected interaction.

35 Claims, 21 Drawing Sheets

(56) References Cited

U.S. PATENT DOCUMENTS

| | | | |
|---|---|---|---|
| 2009/0177779 | A1 | 7/2009 | DeVal et al. |
| 2009/0204949 | A1 | 8/2009 | Howland et al. |
| 2009/0292518 | A1 | 11/2009 | Shachar et al. |
| 2010/0049821 | A1* | 2/2010 | Oved .......................... 709/212 |
| 2010/0070753 | A1 | 3/2010 | Kido et al. |
| 2011/0296436 | A1 | 12/2011 | Moore et al. |

OTHER PUBLICATIONS

Eckard Bringmann, Automated model-based testing of control software with TPT, 2008 pp. 1-19.*
Hooman, Jozef, et al., "Coupling Simulink and UML Models," http://www.mbsd.cs.ru.nl/publications/papers/hooman/FORMS04.pdf, 2004, pp. 1-8.
Heverhagen, Torsten, et al., "A Profile for Integrating Function Blocks into the Unifiled Modeling Language," http://www-verimag.imag.fr/EVENTS/2003/SVERTS/PAPERS-WEB/08-Heverhagen-FunctionBlockAdapters.pdf, Oct. 20, 2003, pp. 1-19.
Cleaveland, Rance, et al., "AN Instrumentation-Based Approach to Controller Model Validation," Model-Driven Development of Reliable Automotive Services. Second Automotive Software Workshop, ASWSD 2006, Revised Selected Papers Springer-Verlag Berlin, 2008, pp. 1-14.
Traub, Matthias, et al., "Generating Hardware Descriptions from Automotive Function Models for an FPGA-Based Body Controller: A Case Study," http://www.mathworks.com/automotive/macde2008/proceedings/day2/04_daimler_generting_hw_descriptions_with_hdl_coder_papers.pdf, 2008, pp. 1-8.
"Real-Time Workshop: For Use with Simulink—Getting Started," Version 6, The Math Works, Inc., Jun. 2004, pp. i-iv, 1-1 to 1-20 and 2-1 to 2-30.
"Notification of Transmittal of the International Search Report and the Written Opinion of the International Searching Authority, or the Declaration," International Filing Date: May 27, 2011, International Application No. PCT/US2011/000964, Applicant: The MathWorks, Inc., Date of Mailing: Aug. 25, 2011, pp. 1-12.
McQuillan, John M., et al., "Some Considerations for a High Performance Message-Based Interprocess Communication System," Bolt Beranek and Newman, Inc., Jul. 1975, pp. 77-86.
Krahl, David, "Extendsim 7," IEEE, Proceedings of the 2008 Winter Simulation Conference, Winter 2008, pp. 215-221.
Krahl, David, et al., "A Message-Based Discrete Event Simulation Architecture," IEEE, Proceedings of the 1997 Winter Simulation Conference, Winter 1997, pp. 1361-1367.
Hoffmann, Ph.D., Hans-Peter, "SysML-Based Systems Engineering Using a Model-Driven Development Approach," Telelogic, An IBM Company, Version 1, Jul. 2008, pp. 1-16.
Bagrodia, Rajive I., et al., "A Message-Based Approach to Discrete-Event Simulation," IEEE, IEEE Transactions on Software Engineering, vol. SE-13, No. 6, Jun. 1987, pp. 654-665.
"Simulink® Verification and Validation 2: User's Guide," The MathWorks, Inc., Sep. 2007, pp. i-xii, 1-1 to 1-6, 2-1 to 2-58, 3-1 to 3-32, 4-1 to 4-28, 5-1 to 5-66, 6-1 to 6-30, 7-1 to 7-4, 8-1 to 8-56, 9-1 to 9-4, 10-1 to 10-42, A-1 to A-4, and Index-1 to Index-4.
Notification of Transmittal of the International Search Report and the Written Opinion of the International Searching Authority, or the Declaration, International Filing Date: May 27, 2011, International Application No. PCT/US2011/000967, Applicant: The MathWorks, Inc., Date of Mailing: Aug. 26, 2011, pp. 1-12.
"Simulink, Model-based and System-based Design", The MathWorks, 2004, pp. 1-488.
"Public Health Information Network Messaging System (PHINMS),"Technical Guide Version 2.8.01, U.S. Department of Health & Human Services, Feb. 2, 2009, pp. 1-50.
"Simulink® 7: User's Guide," The MathWorks, Inc., Sep. 2009, pp. i-xlvi, 1-1 to 1-46, 2-1 to 2-44, 3-1 to 3-34, 4-1 to 4-138, 5-1 to 5-30, 6-1 to 6-84, 7-1 to 7-60, 8-1 to 8-26, 9-1 to 9-60, 10-1 to 10-88, 11-1 to 11-30, 12-1 to 12-66, 13-1 to 13-58, 14-1 to 14-28, 15-1 to 15-36, 16-1 to 16-28, 17-1 to 17-46, 18-1 to 18-16, 19-1 to 19-68, 20-1 to 20-32, 21-1 to 21-32, 22-1 to 22-16, 23-1 to 23-10, 24-1 to 24-24, 25-1 to 25-12, 26-1 to 26-42, 27-1 to 27-36, 28-1 to 28-26, 29-1 to 29-46, 30-1 to 30-160, 31-1 to 31-32, Glossary-1 to Glossary-2, A-1 to A-4, Index-1 to Index-22.
"Creating and Managing Timing Diagrams", IBM, retrieved from www.ibm.com on Mar. 29, 2013, 5 pages.
"Creating Communication Diagrams", IBM, retrieved from www.ibm.com on Mar. 29, 2013, 12 pages.
"Creating Sequence Diagrams", IBM, retrieved from www.ibm.com on Mar. 29, 2013, 24 pages.
"UML Sequence Diagrams", uml-diagrams.org, retrieved from http://www.uml-diagrams.org/sequence-diagrams.html on Mar. 29, 2013, 18 pages.
U.S. Appl. No. 14/163,147, filed Jan. 24, 2014 by Hidayet T. Simsek et al. for Message-Based Modeling, pp. 1-64.
Ciancarini, Paolo, "Exercises on Basic UML Behaviors," Nov. 2013, pp. 1-38.
Dumond, Yves, et al., "A Relationship Between Sequence and Statechart Diagrams," 2000, pp. 1-6.
Gronmo, Roy, et al., "From UML 2 Sequence Diagrams to State Machines by Graph Transformation," Journal of Object Technology, AITO-Association Internationale pour les Technologies Objets, JOT, vol. 10, Jun. 2011, pp. 1-22.
Harel, David, et al., "Synthesis Revisited: Generating Statechart Models from Scenario-Based Requirements," Formal Methods in Software and Systems Modeling, LNCS, vol. 3393, Springer-Verlag Berlin, Heidelberg, Jan. 13, 2005, pp. 1-18.
Latronico, Beth, et al., "Representing Embedded System Sequence Diagrams as a Formal Language," Electrical & Computer Engineering, Carnegie Mellon University, UML, Oct. 2001, pp. 1-23.
U.S. Appl. No. 13/117,531, filed May 27, 2011 by Hidayet Tunc Simsek et al. for Message-basedmodeling, pp. 1-62.
Whittle, Jon, et al., "Generating Statechart Designs From Scenarios," Jun. 2000, pp. 1-10.

* cited by examiner

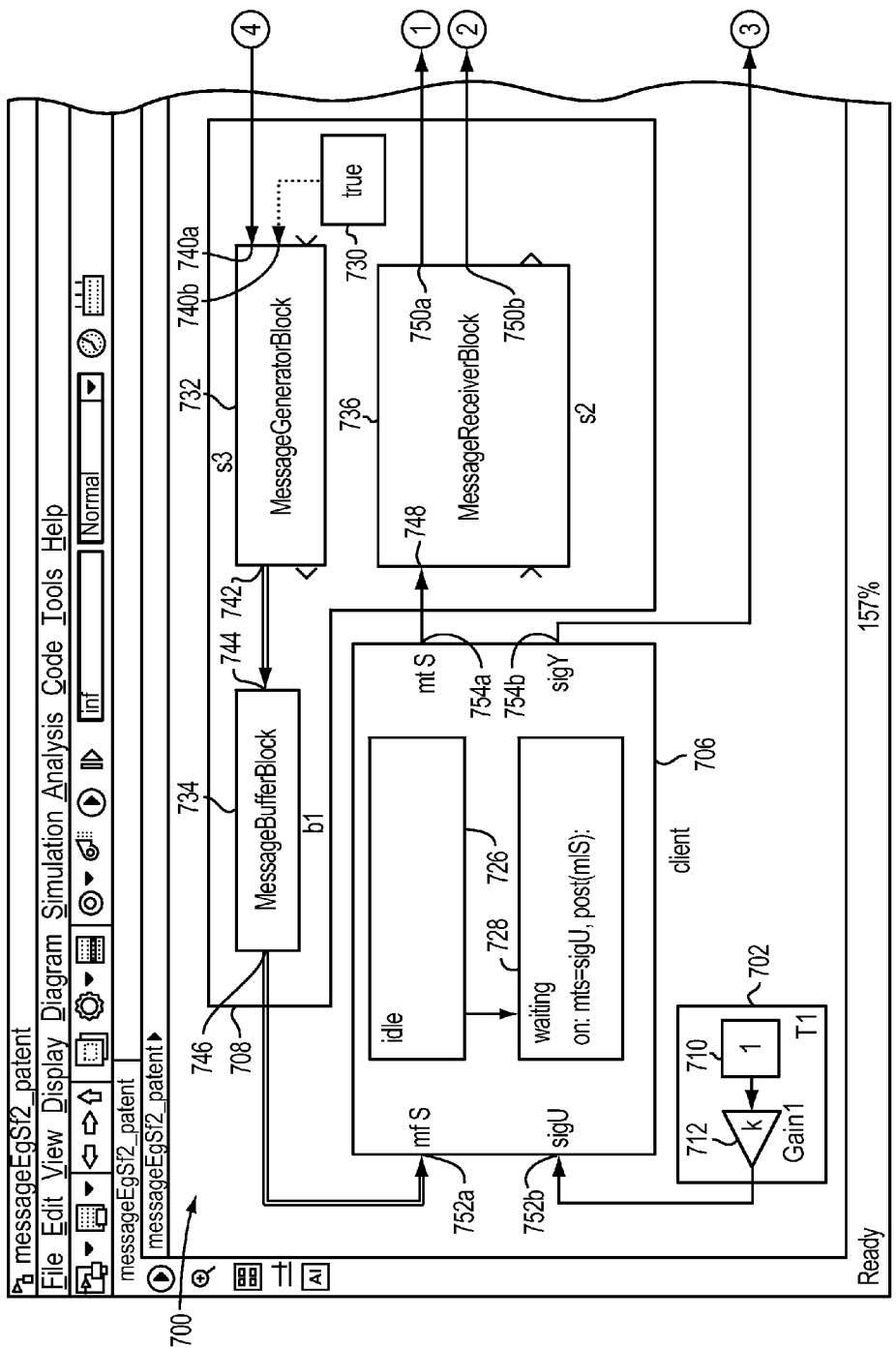

MESSAGE-BASED MODEL VERIFICATION

CROSS-REFERENCE TO RELATED APPLICATIONS

The present application claims the benefit of U.S. Provisional Patent Application Ser. No. 61/349,401, which was filed on May 28, 2010, by Alan Moore et al., for a MESSAGE BASED TRACES AND VERIFICATION, which is hereby incorporated by reference in its entirety.

BRIEF DESCRIPTION OF THE DRAWINGS

The invention description below refers to the accompanying drawings, of which:

FIGS. 7A and 7B is an illustration of a graphical model having executable semantics;

DETAILED DESCRIPTION OF ILLUSTRATIVE EMBODIMENTS

Overview

Figure 1:
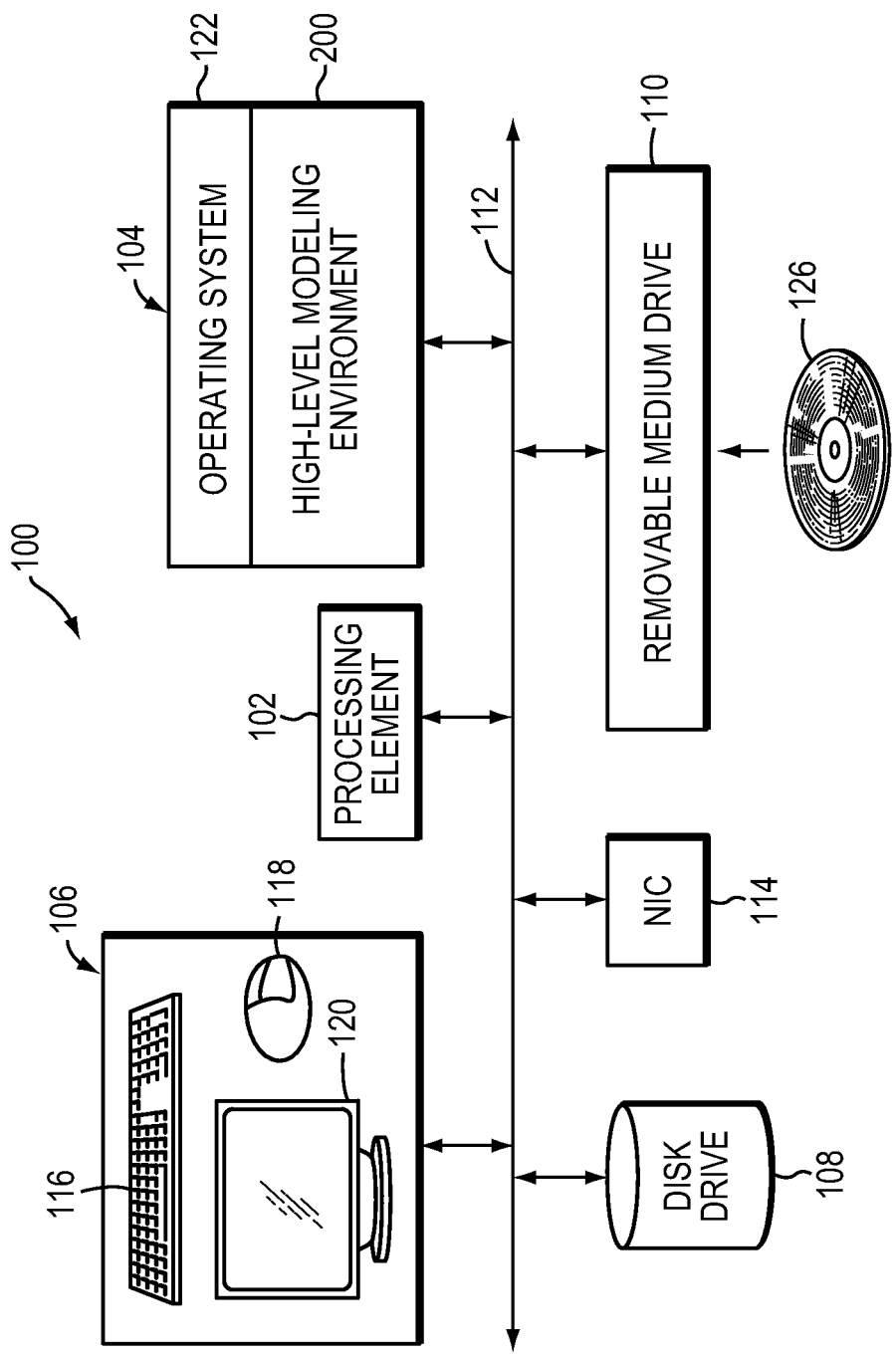
FIG. 1 is a schematic illustration of a data processing system.

Exemplary embodiments can be used for generating executable block diagrams in which at least some of the blocks run in accordance with message-based execution semantics. Each message may be an instance of a message type, and may include a payload comprising one or more data elements that do not change over time. A message may be generated at a particular point in time by a source block of the diagram, and may persist for a determined time interval. Message types may be organized in one or more class hierarchies. In particular, a plurality of base message types may be defined, and for each base message type there may be one or more derived message types. Through the organization of the class hierarchy, a message-based block capable of receiving a base message type may also be capable of receiving any of the message types that are derived from that base message type. A message-based block capable of receiving a particular derived type of message, however, may not be capable of receiving the corresponding base message type.

A message-based modeling system, which may be included within a high-level modeling environment, may support message-based functionality in the block diagram. The system may include a library of pre-defined graphical blocks configured to generate and send messages, and to receive and process messages. The library of message-based blocks may be organized as a class hierarchy. The modeling environment may include a graphical editor that provides a canvas in which a user may construct a block diagram. Each message-based block may have one or more message ports for sending and receiving messages. In response to the message ports of selected blocks being interconnected, such as through message-based connections extending from source ports to destination ports, the system may establish message-based relationships among the interconnected blocks.

The system may further include a propagation engine that checks the message types among the interconnected message-based blocks of the diagram. This process may be performed as part of a compilation of the block diagram. Specifically, the propagation engine may determine whether a message type expected by a destination message-block is compatible with the message type generated by the source message-block. For example, if a destination block expects to receive a message of a base message type as provided in the class hierarchy, and the source block generates either the specified base message type or a message type that is derived from the specified base message type, then the propagation engine may determine that the message-based relationship is valid. If the destination block expects a different base or derived message type than the one generated by the source block, or the destination block expects a derived message type and the source generates a base message type, then the propagation engine may determine that the message-based relationship is not valid, and may issue a compilation error.

The system may also include a message-based execution engine that controls the execution of the message-based blocks in the diagram. More specifically, during execution, a source block generates a message at a particular point in time. The message-based execution engine may maintain the message for a determined time interval. In addition, the execution engine may send the message to one or more destination blocks, triggering the execution of the one or more destination blocks, and the execution engine may control the processing of the message by the one or more destination blocks.

In an embodiment, the high-level modeling environment may include systems that support other execution domains, such as a time-based execution domain. In addition, the message-based system may cooperate with such a time-based execution system environment to implement a message/time-based hybrid execution model. The time-based system may include a library of time-based blocks, and selected time-based blocks may be added to the block diagram. A time-based block describes a dynamic system of equations that defines time-based relationships between signals and state variables. Signals represent quantities that change over time, and may have values at all points in time. The relationships between signals and state variables may be defined by the set of equations represented by the time-based blocks. Time-based blocks may include signal ports that may be interconnected with signal-based connections. The source of a signal corresponds to the block that writes to the signal during the evaluation of the block's equations, and the destination of the signal is the block that reads the signal during the evaluation of the destination block's equations.

The time-based execution engine executes the time-based blocks in the diagram by evaluating the relationships between signals and state variables over time beginning at a start time and continuing to a stop time. Each evaluation of the relationships may be referred to as a time step.

As mentioned, the message-based system and the time-based execution engine may cooperate to implement a hybrid environment. In particular, the time-based execution engine may organize the blocks into a sorted order, which refers to the order in which the blocks' operations or methods (e.g., execution methods), are invoked. The time-based blocks are then executed according to the sorted order. When a message is generated within the block diagram, the execution of the time-based blocks may be suspended, and the message may be sent to one or more destination blocks. The one or more destination blocks may then receive and process the message. When the processing of the message by the one or more destination blocks is complete, execution of the time-based blocks according to the sorted order may resume.

The message-based system may also include a verification engine. The verification engine may support a library containing one or more verification blocks. Instances of the verification blocks may be added to the block diagram to evaluate the operation of message-based blocks. The types of verification blocks may include an observer type, a message sink type, a generator type, and a scenario type. The observer block may be used to visualize a set of messages, referred to as a trace, generated by one or more selected message-based blocks of the block diagram. The set of messages of the trace may be ordered in time between a start time and an end time by the observer block. The observer block may be a floating block within the block diagram, and it may be associated with a message-based connection. The message sink block may be directly connected to a message-based block, and may be used to visualize a trace generated by that message-based block. The generator block may be used to represent an external source of messages to the block diagram. The generator block may be connected to one or more message-based blocks as a source, and configured to generate one or more messages or traces that may then be received and processed by the one or more message-based blocks to which the generator block is connected. The scenario block may be used to define valid and invalid traces. It may also or alternatively be used to define one or more constraints on one or more messages or traces. For example, temporal constraints may be defined on one or more messages, or between two or more messages. The scenario block may be associated with one or more message-based connections in the block diagram whose messages may form a runtime trace to be evaluated. The scenario block may compare the defined valid and invalid traces, and the one or more constraints, to the runtime trace produced during execution of the block diagram. The scenario block may be further configured to take one or more actions if one or more of the runtime traces is not equivalent to the defined valid traces, or the runtime traces are equivalent to the defined invalid traces. The scenario block may also take a specified action if the one or more constraints are not satisfied.

FIG. 1 is a schematic illustration of a computer or data processing system 100 for implementing and utilizing an embodiment of the invention. The computer system 100 includes one or more processing elements, such as a processing element 102, a main memory 104, user input/output (I/O) device 106, a data storage unit, such as a disk drive 108, and a removable medium drive 110 that may all be interconnected by a system bus 112. The computer system 100 may also include a communication unit, such as a network interface card (NIC) 114. The user I/O device 106 may include a keyboard 116, a pointing device, such as a mouse 118, and a display 120. The main memory 104 may store a plurality of libraries or modules, such as an operating system 122, and one or more applications running on top of the operating system 122, including a high-level modeling environment 200.

The removable medium drive 110 may accept and read a computer readable medium 126, such as a CD, DVD, floppy disk, solid state drive, tape, flash memory or other medium. The removable medium drive 110 may also write to the computer readable medium 126.

Suitable computer systems include personal computers (PCs), workstations, laptops, tablets, palm computers and other portable computing devices, etc. Furthermore, exemplary processing elements include single or multi-core Central Processing Units (CPUs), Graphics Processing Units (GPUs), Field Programmable Gate Arrays (FPGAs), Application Specific Integrated Circuits (ASICs), etc. Nonetheless, those skilled in the art will understand that the system 100 of FIG. 1 is intended for illustrative purposes only, and that the present invention may be used with other computer systems, data processing systems or computational devices. The present invention may also be used in a networked, e.g., client-server, computer architecture, or a public and/or private cloud computing arrangement.

Suitable operating systems 122 include the Windows series of operating systems from Microsoft Corp. of Redmond, Wash., the Linux operating system, the MAC OS® series of operating systems from Apple Inc. of Cupertino, Calif., and the UNIX® series of operating system, among others.

A user or developer, such as an engineer, scientist, programmer, etc., may utilize the keyboard 116, the mouse 118, and the display 120 to operate the high-level modeling environment 200, and construct or open one or more models of a system that is being designed. The model, which may have executable semantics, may represent a real-world dynamic system that is being modeled, simulated, and/or analyzed by the user.

Figure 2:
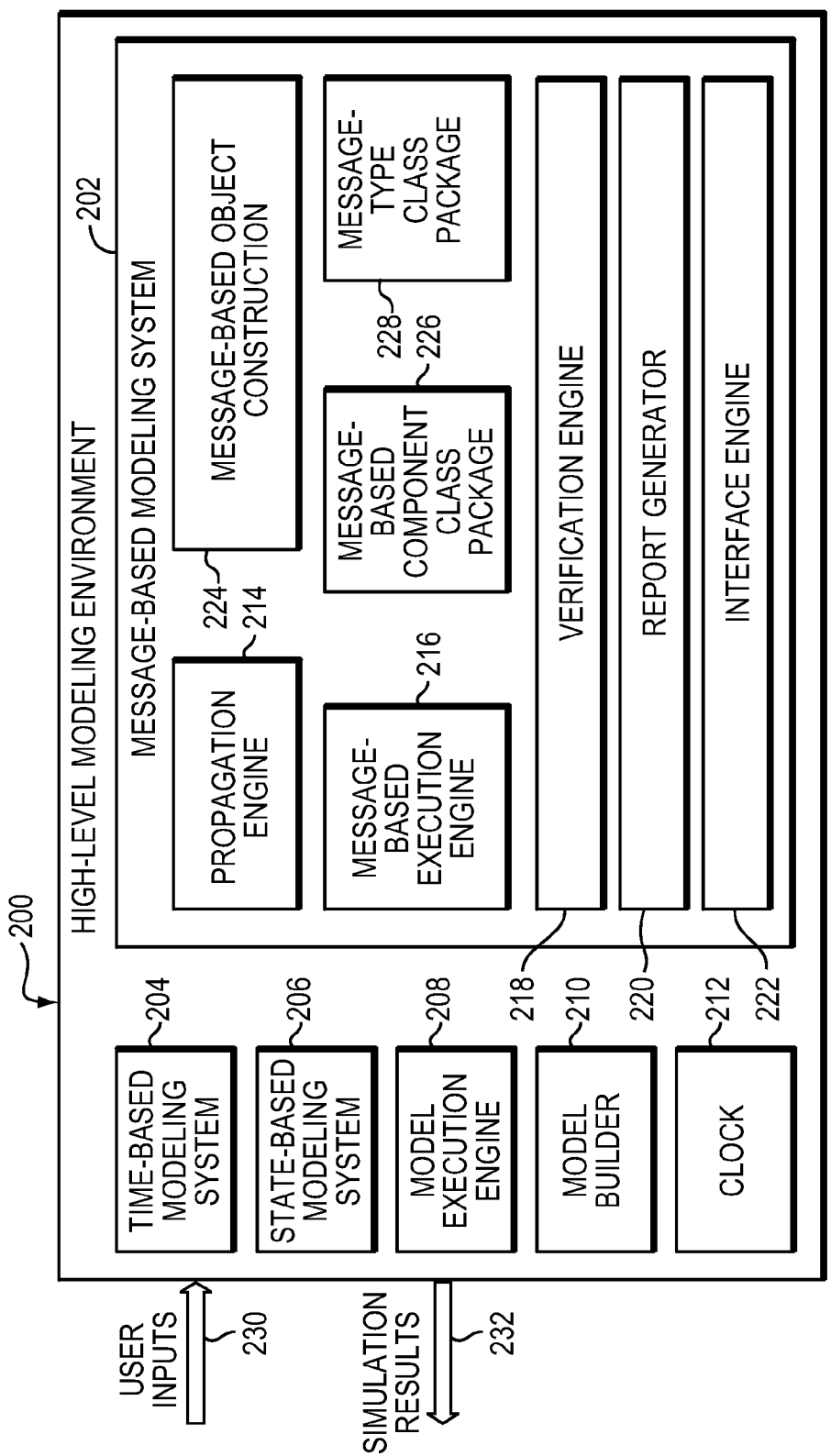
FIG. 2 is a partial, functional diagram of a high-level modeling environment.

FIG. 2 is partial block diagram of an embodiment of the high-level modeling environment 200. The environment 200 may include a message-based modeling system 202, and one or more additional modeling systems, such as a time-based modeling system 204, and a state-based modeling system 206. The environment 200 also may include a model execution engine 208, a model builder 210, and a clock source, such as clock 212. The message-based modeling system 202 may include a plurality of components or modules. In particular, it may include a propagation engine 214, a message-based execution engine 216, a verification engine 218, a report generator 220, and an interface engine 222. The system 202 may also include an object constructor 224 that may access one or more class packages, such as message-based component class package 226, and a message-type class package 228.

In an implementation, high-level modeling environment 200 may receive inputs by a user as the user creates, edits, revises, and/or opens one or more models, as indicated by arrow 230. The model execution engine 208 in cooperation with the modeling systems 202, 204 and 206 may execute the model generating one or more results that may be presented to the user, as indicated by arrow 232. A model may include a plurality of portions each operating according to a different execution domains. For example, a first portion may operate according to message-based semantics, a second portion may operate according to time-based semantics, and a third portion may operate according to state-based semantics.

In an embodiment, a graphical model may be executable such that the model receives one or more inputs, processes those inputs, and produces one or more outputs.

In an embodiment, a suitable high-level modeling environment includes the MATLAB® technical computing environment from The MathWorks, Inc. of Natick, Mass. The high-level modeling environment may thus operate at a level that is even higher than other well-known programming languages, such as the C, C++, and C# programming languages. A suitable time-based modeling system includes the SIMULINK® environment from The MathWorks, Inc. A suitable state-based modeling system includes the Stateflow charting tool from The MathWorks, Inc.

It should be understood that other modeling tools in addition to or in place of the time-based modeling system 204 and/or the state-based modeling system 206 may be used in the environment 200. Other such modeling tools include dataflow systems, such as the LabVIEW programming system from National Instruments Corp. of Austin, Tex., and the Visual Engineering Environment (VEE) from Agilent Technologies, Inc. of Santa Clara, Calif., physical modeling systems, such as The Simscape product from The MathWorks, Inc., Unified Modeling Language (UML) systems, and Systems Modeling Language (SysML) systems, among others. In addition, a lower level programming language, such as the C, C++, and C# programming languages, among others, may also be used to create one or more models or model portions.

The propagation engine 214, message-based execution engine 216, verification engine 218, report generator 220, interface engine 222, message-based object constructor 224, and class packages 226, 228 may each comprise registers and combinational logic configured and arranged to produce sequential logic circuits. In an embodiment, the propagation engine 214, message-based execution engine 216, verification engine 218, report generator 220, interface engine 222, message-based object constructor 224, and class packages 226, 228 may be implemented through one or more software modules or libraries containing program instructions pertaining to the techniques described herein. The software modules may be stored on main memory 104 and/or computer readable media, such as computer readable medium 126, and executable by one or more processing elements, such as processing element 102. Other computer readable media may also be used to store and execute these program instructions. In alternative embodiments, various combinations of software and hardware, including firmware, may be utilized to implement the present invention.

In an embodiment, the message-based components of a graphical model as well as the messages generated during execution of the model may be objects, and these objects may be defined by creating "classes" which are not objects themselves, but which act as templates that instruct the constructor 224 how to construct an actual component and message object. A class may, for example, specify the number and type of data variables and the steps involved in the functions which manipulate the data. The object constructor 224 may use the corresponding class definition and additional information, such as arguments provided during object creation, to construct the object. Likewise, objects may be destroyed by a special function called a "destructor". Objects may be used by manipulating their data and invoking their functions.

Figure 3:
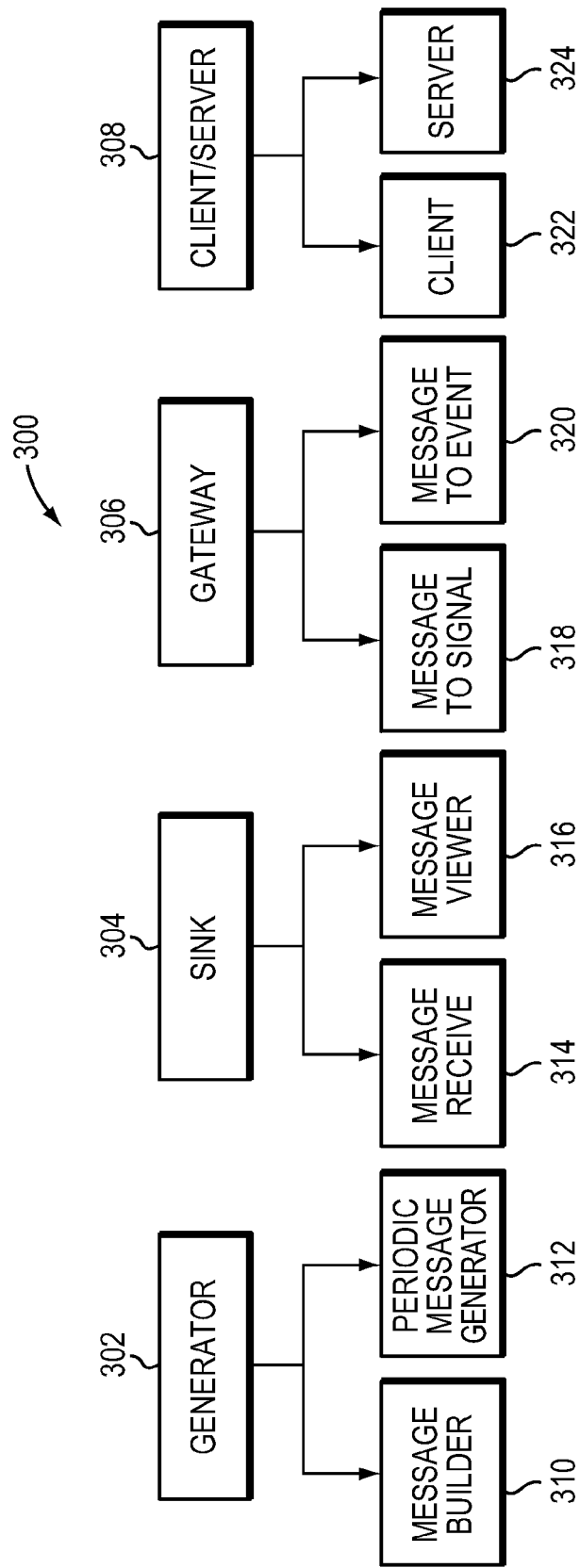
FIG. 3 is a schematic illustration of a class hierarchy of message-based components.

FIG. 3 is a schematic illustration of an exemplary class hierarchy 300 of message-based components. Instances of objects defined in the class hierarchy 300 may be constructed for use in a graphical model. The class hierarchy 300 may include one or more base classes, such as a Generator class 302, a Sink class 304, a Gateway class 306, and a Client/Server class 308. In addition, one or more of the base classes may include one or more derived classes, which may also be referred to as sub-classes. For example, the Generator base class 302 may include a Message Builder subclass 310 and a Period Message Generator subclass 312. The Sink base class may include a Message Receive subclass 314 and a Message Viewer subclass 316. The Gateway base class 306 may include a Message to Signal subclass 318 and a Message to Event subclass 320. The Client/Server base class 308 may include a Client subclass 322 and a Server subclass 324.

It should be understood that other, possibly more complex, class hierarchies may be provided. For example, additional base classes may be provided, and one or more of the sub-classes may include subclasses of its own, and so on.

Figure 4:
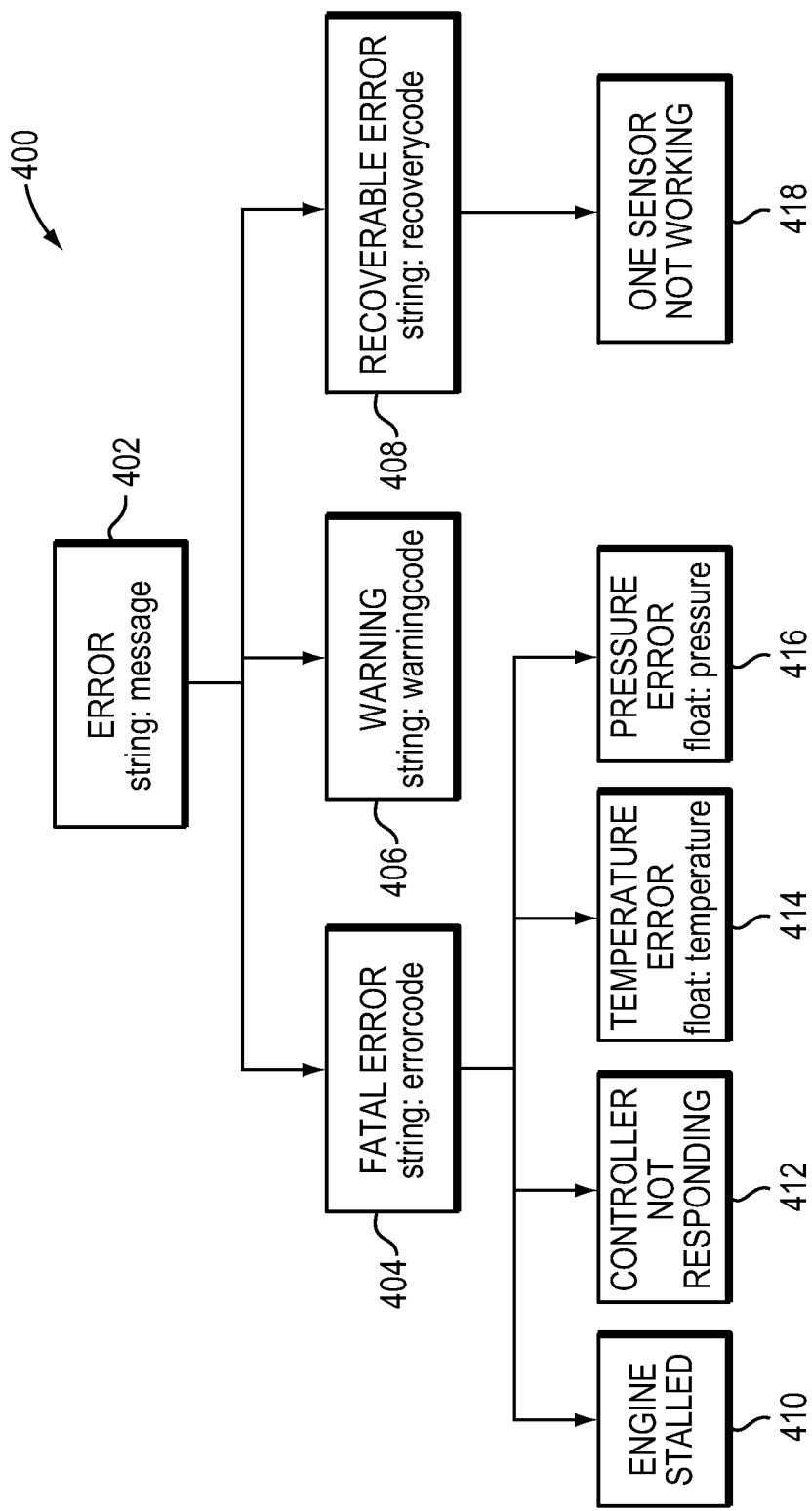
FIG. 4 is a schematic illustration of a class hierarchy of message types.

FIG. 4 is a schematic illustration of an exemplary class hierarchy 400 of message types, such as error messages. The hierarchy 400 may include an Error base class 402. The Error base class 402 may have one string property named "message". The Error base class 402 may include a plurality of derived classes, such as a Fatal Error subclass 404, a Warning subclass 406, and a Recoverable Error subclass 408, which may define other class specific properties. The Fatal Error subclass 404 may have one string property named "errorcode". The Warning subclass 406 may have one string property named "warningcode". The Recoverable Error subclass 408 may have one string called "recoverycode". Furthermore, the Fatal Error subclass 404 may have a plurality of derived classes, such as an Engine Stalled subclass 410, a Controller Not Responding subclass 412, a Temperature Error subclass 414, and a Pressure Error subclass 416. The Temperature Error subclass 414 may have one floating point property called "temperature", and the Pressure Error subclass 416 may have one floating point property called "pressure". The Recoverable Error subclass 408 may have one derived class, such as a One Sensor Not Working subclass 418.

While the message types are referred to as classes, in an embodiment, they do not have any methods. Instead, the specialization of the message classes may add new properties, i.e., data members, only.

Figure 5:
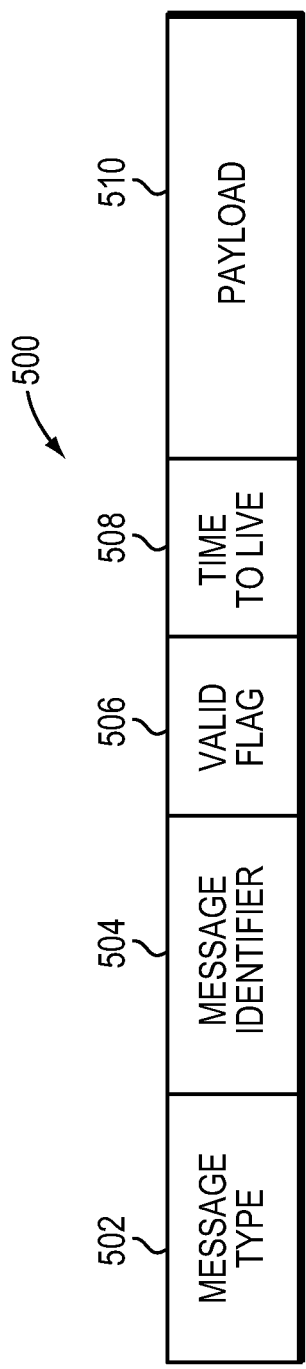
FIG. 5 is a schematic illustration of a data structure for storing data elements of a message.

In an embodiment, an instance of a message object may include one or more data elements. FIG. 5 is a schematic illustration of a data structure 500 representing the data elements of an instance of a message object. The data structure 500 may be organized into a plurality of fields and sub-fields each storing particular information. For example, the data structure 500 may include a message type field 502, a message identifier (ID) field 504, a valid flag 506, a time to live (TTL) field 508, and a payload field 510. The message type field 502 may store information that indicates the particular type of message, the message ID field 504 may store an identifier that uniquely identifies the message, the valid flag 506 may indicate whether the message is valid or invalid, the TTL field 508 may store information indicating how long the message should be maintained, and the payload field may store information associated with the message that was generated by the message source and that may be used by one or more message destinations.

It should be understood that the data structure may include additional or fewer fields. In addition, the payload field 510 may be organized into a plurality of sub-fields.

In another embodiment, message-based components and/or messages may be instances generated from types, instead of being objects generated from classes. Those skilled in the art will understand that other implementations of message-based components and/or messages may be utilized.

Figure 6A:
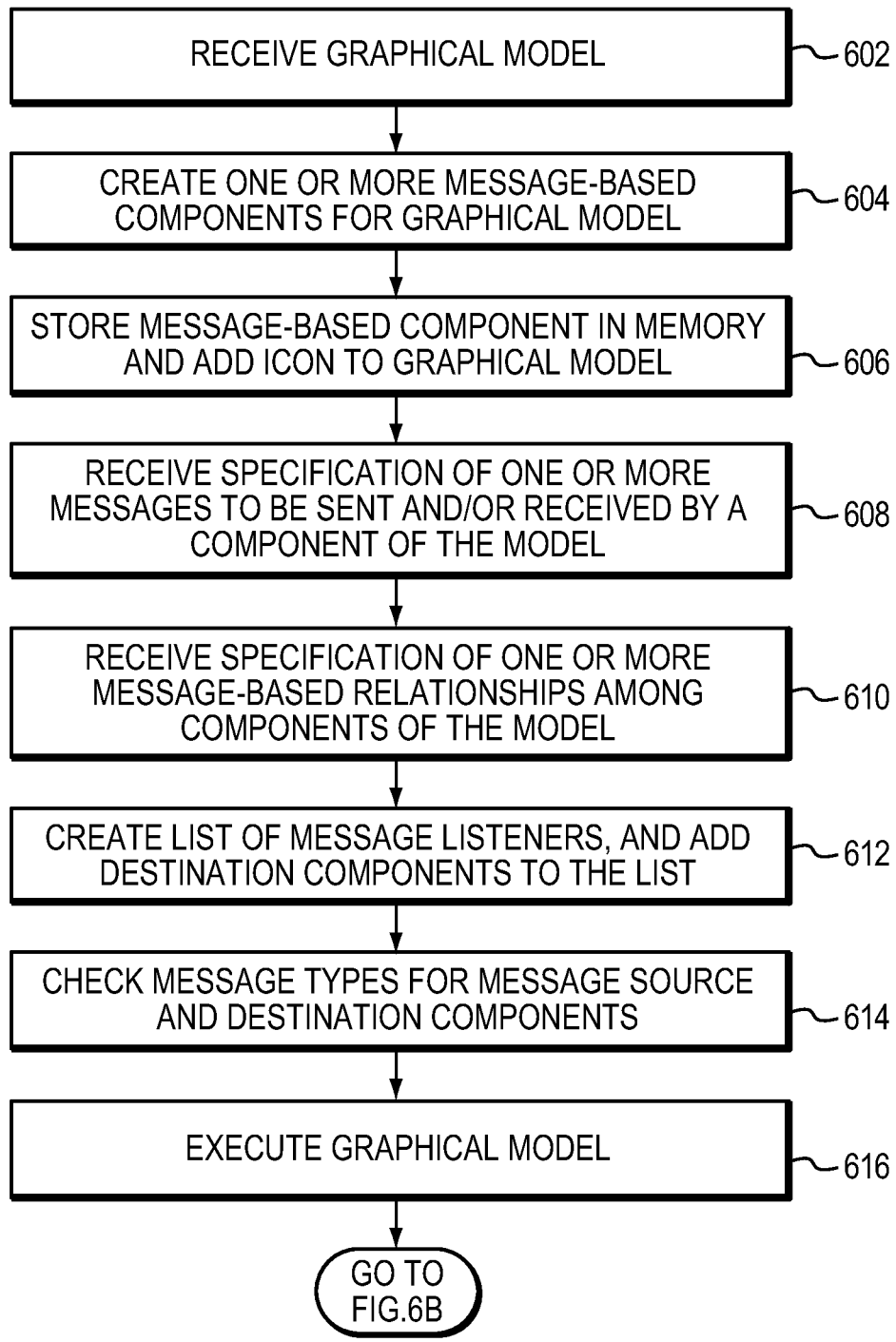
FIGS. 6A to 6C is a flow diagram of exemplary processing that can be used in accordance with an embodiment of the invention.
Figure 6B:
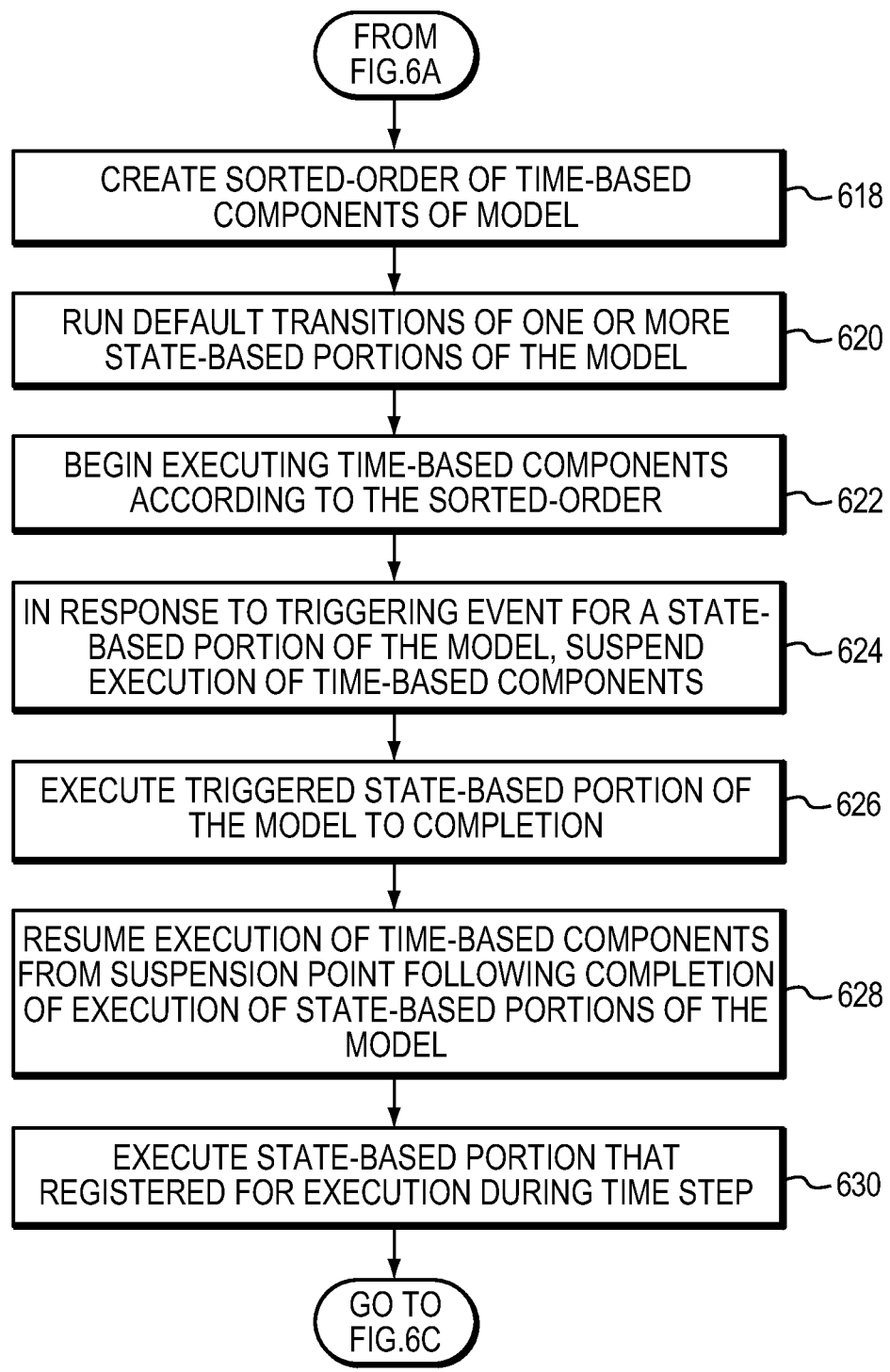
Figure 6C:
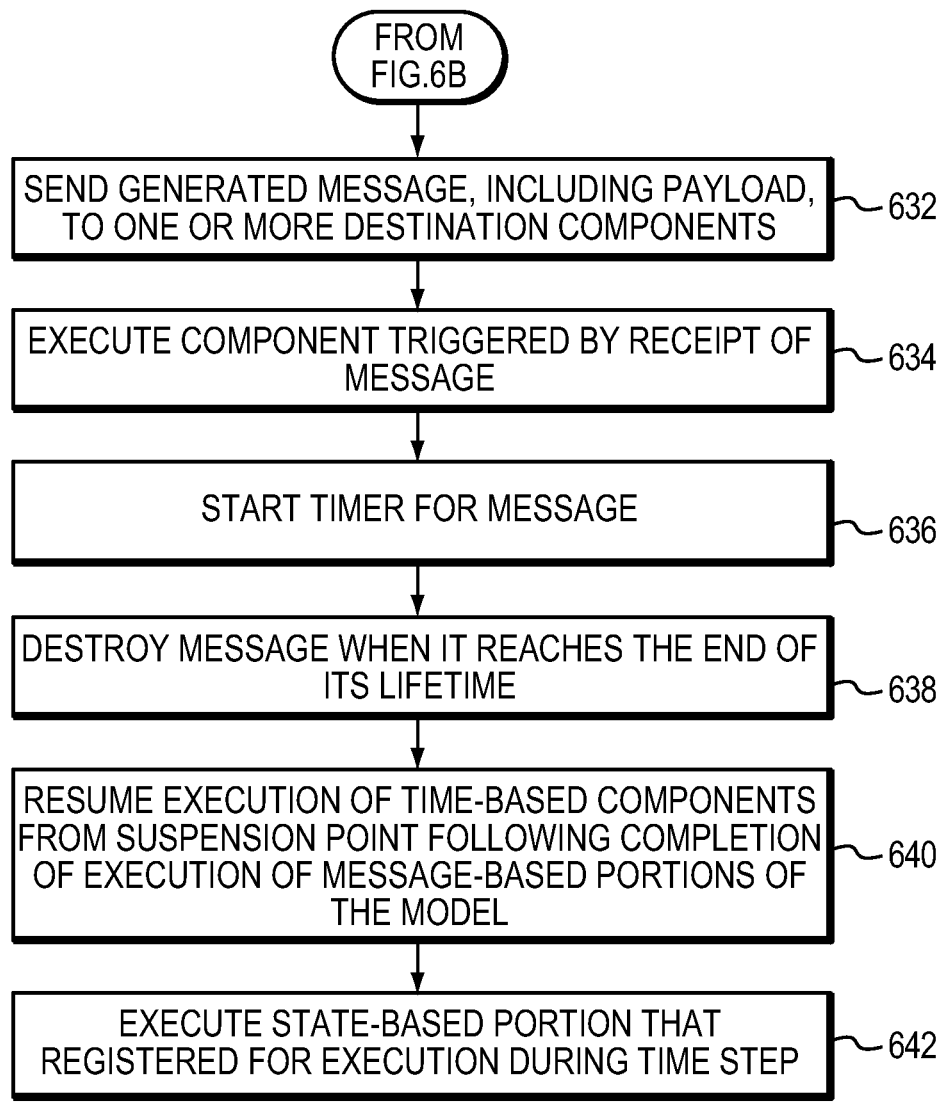

FIGS. 6A-C is a flow diagram illustrating exemplary processing for practicing an embodiment of the invention. The high-level modeling environment 200 may receive inputs from a user constructing or opening a model, as indicated at block 602. Environment 200 may support the creation of models through graphical, textual, or a combination of graphical and textual inputs. The user may operate and interact with environment 200 through the user I/O 106, such as the keyboard 116, mouse 118, and display 120. For example, the environment 200 and/or one or more of the message-based modeling system 202, the time-based modeling system 204, and the state-based modeling system 206 may present one or more model editor windows on the display 120. The model editor may include a plurality of graphical elements, such as a menu bar, a tool bar, and a canvas. In addition, the message-based modeling system 202, the time-based modeling system 204, and the state-based modeling system 206 may each provide a library browser window or palette that presents a plurality of component types. The user may select one or more component types from the library browsers or palettes, and place respective ones of those components on the canvas. The user may then connect the components, e.g., with connections, that may appear as lines or arrows on the canvas, thereby establishing message-based, mathematical time-based, state-based, dataflow, or other relationships among the components placed onto the canvas.

The environment 200 may also support the creation of a model programmatically.

In an embodiment, a user may select one or more types of message-based components from the library browser. In response, the constructor 216 may access the component class package 226, and create an object instance of the selected type, as indicated at block 604. The object instance may be stored in memory, such as main memory 104, and an icon, such as a block, may be added to the canvas, as indicated at block 606.

The user may configure one or more of the components of the model to generate and/or receive a message, as indicated at block 608. For example, a user may open a properties or other page associated with a selected message-based component that has been added to the canvas. The property page may include fields or other data entry elements for receiving information, for example, from the user, specifying a message type that the component is to receive. In response, the object constructor 224, or another module, such as the model builder 210, may add an input port to the block as presented on the canvas. Similarly, the property page, or another property page, may include fields and data entry elements for receiving information that specifies a message type that a selected component is to send. In response, an output port may be added to the block as presented on the canvas. In this way, a user may add a plurality of blocks representing message-based components to the canvas, and provide these blocks with input and output ports for receiving and sending messages.

The user may define message-based relationships among the message-based components of the model as well as the other components, as indicated at block 610. For example, the user may define a message-based relationship graphically by drawing a message-based connection between the input and output ports of message-based blocks. More specifically, the user may configure a given message-based component to receive a particular message by drawing a connection from the source of the message, such as the output port of another message-based component, to the respective input port of the given message-based component. Likewise, the user may configure a selected message-based component to send a message by drawing a connection from the respective output port of the selected message-based component to the destination of the message. In response to the definition of message-based relationships, e.g., by the user, the message-based execution engine 216 may add the destination component to a list of listeners for the respective message, as indicated at block 612. Specifically, the execution engine 216 may create a list of listeners for each message for which a message-based relationship has been defined in the model. If a message-based relationship is removed, for example, by the user deleting a message-based connection between two message-based blocks, the execution engine 216 may remove the destination component from the list of listeners for that message.

In an embodiment, model components operating in domains other than the message-based execution domain, may be configured to send or receive messages. For example, a user may draw a message-based connection between a message-based block and a block operating in another domain, such as the time-based domain, the state-based domain, the dataflow domain, etc. Likewise, a user may draw a message-based connection from a block operating in another domain to a message-based block.

Figure 7B:
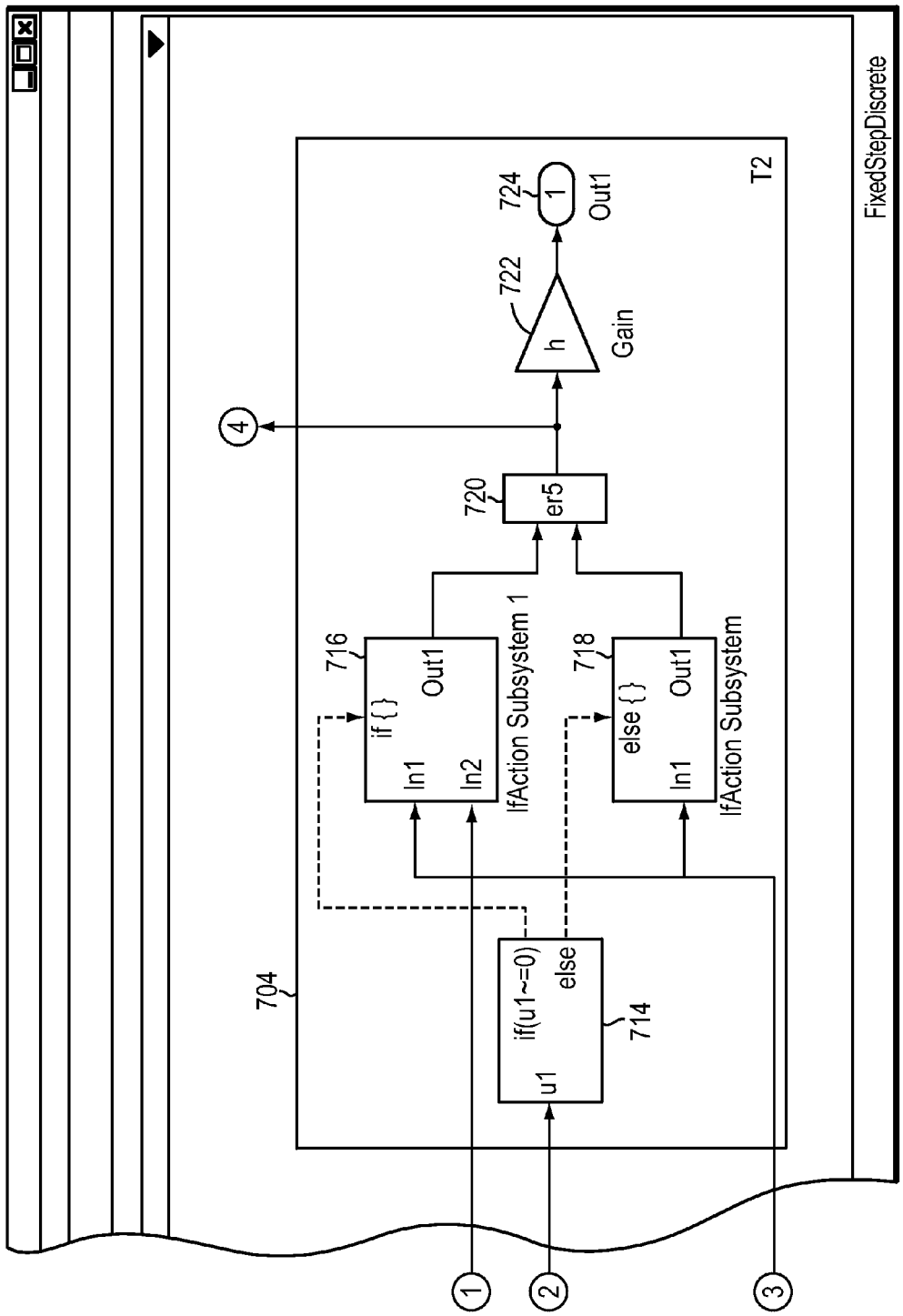

FIGS. 7A and 7B is a schematic illustration of an exemplary graphical model 700. The model 700 may be constructed and/or opened by a user. The model 700 may include a first time-based portion 702, a second time-based portion 704, a state-based portion 706, and a message-based portion 708. Each portion may include a plurality of components, such as blocks or subsystems. Specifically, the first time-based portion 702 may include a Constant block 710 and a Gain block 712. The second time-based portion 704 may include an If block 714, a first Subsystem 716, a second Subsystem 718, a Mux block 720, a Gain block 722, and an Outport block 724. The state-based portion 706 may include an Idle state 726 and a Waiting state 728. The message-based portion 708 may include a True block 730, Message Generator block 732, a Message Buffer block 734, and a Message Receiver block 736.

The Message Generator block 732 may be configured to have two input ports 740*a*, 740*b*, each associated with a respective type of message that the Message Generator block 732 is interested in receiving. The Message Generator block 732 also may be configured to have one output port 742 that is associated with a message type that the Message Generator block may send. The Message Buffer block 734 may be configured with an input port 744 and an output port 746, each associated with a respective message type. The Message Receiver block 736 may be configured with an input port 748 and two output ports 750*a*, 750*b*, each associated with a respective message type. In addition, the state-based portion 706 may be configured with a first input port 752*a* that is associated with a type of message, and a second input port 752*b* that is associated with a signal. The state-based portion 706 may be further configured with a first output port 754*a* that is associated with a type of message, and a second output port 754*b* that is associated with a signal.

In an embodiment, the data type of a message payload may specify the type of message.

Message-based relationships may be established among the time-based portions 702, 704, the state-based portion 706, and the message-based portion 708. For example, a user may connect various input and output blocks of the model 700 with message-based connections. In response, constructor 224 may create message object instances, and the execution engine 216 may establish message-based relationships among the respective portions or components of the model 700.

In an embodiment, before execution of the model 700, the propagation engine 214 may analyze the construction and configuration of the model 700 to determine whether, during execution of the model 700, those blocks that are configured to receive messages will receive the intended messages, as indicated at block 614. In particular, the message-based execution engine 216 and the model execution engine 208 may build an in-memory representation of the model 700, such as an intermediate representation (IR). The IR may include a plurality of nodes, that may represent the blocks of the model 700, and edges that represent connections within the model. The IR may also be annotated with additional information, such as the types of messages that destination blocks are configured to receive, the types of messages that source blocks are configured to send, etc. The IR may be created as part of a compilation stage that marks the start of model execution. This compilation stage may include preparing data structures and evaluating parameters, configuring and propagating block characteristics, determining block connectivity, and performing block reduction and insertion. In addition, one or more optimization techniques may be applied to the IR. After the application of an optimization technique, an additional IR may be generated. The propagation engine 214 may analyze one or more of these IRs.

The propagation engine 214 may evaluate this IR examining, for example, those elements of the IR that represent the input ports of message-based and other blocks. The propagation engine 214 may determine the type of message that the given message-block expects to receive on a subject input port. The propagation engine 214 also may identify the upstream block that is connected to the subject input port of the given message-based block. The propagation engine 214 may determine the type of message issued by this upstream block. In addition, the engine 214 may determine whether the type of message defined for the output port of the source component complies with the type of message defined for the input port of the destination component. If a mismatch is identified by engine 214, it may be reported. For example, an error message or error report may be generated and presented, for example on the display 120 for review by the user.

The model 700 may be simulated, e.g., executed or run. For example, the model editor window may include a Run command button that may be selected by the user, e.g., with the mouse 118. Alternatively, the user may enter a text-based run command, for example, in a Command Line Interface (CLI), or the model may be run programmatically.

In an embodiment, the model execution engine 208 interfaces with the time-based system 204, the state-based system 206, and the message-based system 202 to execute the entire model 700, as indicated at block 616.

In an embodiment, the time-based modeling system 204 may create a sorted order of the time-based components of the model 700, as indicated at block 618 (FIG. 6B). The sorted order may refer to the order in which to invoke block methods, during execution of the model 700. Exemplary block methods for time-based components may include an output method that computes the output signals of the block based on its input signals and its state, an update method that computes the block's states, and a derivatives method that computes the derivatives of the block's continuous states. Time-based components that are configured to execute together may be identified as a group in the sorted order. For example, a time-based subsystem may include a plurality of time-based blocks, and the subsystem may be configured to run as an atomic subsystem. In this case, all of the time-based blocks of the atomic subsystem execute atomically as a group. The time-based modeling system 204 may also define a simulation start time, a simulation end time, and a plurality of time steps between the start and end times. The size of the time steps may depend on the particular solver being used to execute the model.

Input and output signals may be represented graphically in the model or block diagram by arrow elements extending between time-based blocks. Input and output signals represent quantities, for example, input and output data that change over time during the execution of the model, and the quantities represented by the signals may be defined, and thus have values, for all points in time between a model's start time and its stop time. Execution of a model may also be referred to as simulation of the model.

In an embodiment, one or more initialization steps may be performed before execution of the model begins. For example, one or more state-based portions of the model may execute one or more default transitions, as indicated at block 620. Initialization steps for message-based portions of the model may involve typical operations, such as dequeuing a waiting message.

For each time step of the simulation, which may begin with the simulation start time, execution of model may proceed as follows. The time-based modeling system 204 in cooperation with the model execution engine 208 may begin executing the time-based components of the model according to the sorted order, as indicated at block 622. If an event that is a triggering event for a state-based portion of the model occurs, the execution of the time-based components may be suspended, as indicated at block 624. The triggered state-based portion may be executed as an atomic unit, for example, by the state-based modeling system 206 in cooperation with the model execution engine 208, as indicated at block 626. Upon completing the execution of the state-based portion, the execution of the time-based components may resume from the point in the sorted-order at which execution had been suspended, as indicated at block 628. For example, the model execution engine 208 may record where in the sorted order the execution was suspended to execute the state-based portion.

In an embodiment, an input triggering event may occur outside of a state-based portion, for example, by a time-based or other component, but may be visible within the state-based portion. Exemplary input trigger events may include an edge-triggered input event and a function call, for example, from a time-based component. An edge-triggered input event may be configured to operate on a rising edge, a falling edge, or either a rising or falling edge. To operate as an input edge-triggered input event, a signal from a time-based component may need to cross zero, such as a changing from −1 to 1. In contrast, a function-call input event may consist of an instantaneous flow of control from a caller subsystem to a callee subsystem. A triggering event for a state-based portion, whether it is an edge, function call or other trigger, may not provide any input data to the state-based portion, which the state-based portion might otherwise use for processing, for example to generate output data. Instead, the triggering event may operate as a control signal that triggers execution of the state-portion, and the state-based portion may operate upon input data that is internal to the state-based portion, or that is received in other ways besides a triggering event.

If the triggering event for the state-based portion occurs during the execution of a group of time-based components that are configured to execute atomically, then the execution of the entire group of time-based components may be completed. Further execution of time-based components may then be suspended, and the execution of the triggered state-based system performed.

If a message is generated and sent, for example, during the execution of time-based components according to the sorted order, then the execution of time-based components may be suspended, as indicated at block 630. The message-based execution engine 216 may examine the list of listeners for the respective message. The execution engine 216 may send the message to the components on the list of listeners, as indicated at block 632 (FIG. 6C). If the destination component is triggered by the receipt of the message, the execution engine 216 may execute the destination component, as indicated at block 634. The message-based execution engine 216 may also start a timer associated with the generation of a message, and may track the age of the message, as indicated at block 636. For example, the engine 216 may use the clock 212 to operate one or more timers. When the age of the message reaches its maximum age, which may be indicated in message's TTL field 508, the message may be destroyed by the message-based execution engine 216, as indicated at block 638. Each message may thus persist for only a defined time period during the execution of a model. Upon completing the execution of the components triggered by the message, the execution of the time-based components may resume from the point in the sorted-order at which execution had been suspended, as indicated at block 640.

It should be understood that the model execution flow described in connection with one or more of steps 622 to 640 may be nested. For example, the execution of a state-based portion may generate a message triggering the execution of a message-based portion, which may trigger the execution of a state-based portion, and so on.

It should be understood that a message may be sent to a message-based component, a state-based component, a time-based component, or some other component. In addition, the message-based component, the state-based component, and the time-based component may execute in response to the received message.

The life-time of a message may depend on the semantics of the message processing environment. A message implemented using function-call semantics may get created and consumed in the same time-step, thus resulting in a lifetime of a single time-step. In the presence of queuing semantics, messages can be produced in one time-step but wait in a message queue for a number of time-steps before they are consumed. In addition, the consumer can choose to process a message without consuming the message, thus resulting in messages with potentially infinite lifetime.

In an embodiment, instead of sending a message to a destination component, the message-based execution engine 216 may notify a destination component that a message has been created. In response, the destination component may retrieve the message. If the destination component fails to retrieve the message before its maximum age is reached, the message may be destroyed before ever being retrieved.

In an embodiment, a message-based component may be configured, upon sending a message, to expect a reply to its message. Such a component may be configured to execute in a synchronous or asynchronous manner. For example, the component may be configured to execute synchronously in which case the component, after sending its message, waits to receive the reply before continuing with its execution. Alternatively, the component may be configured to execute asynchronously in which case the component, after sending its message, proceeds with its execution without waiting for the reply.

In an embodiment, a state-based portion of the model may be configured to execute during a time step even though no triggering event for that state-based portion occurred during the time step. More specifically, a state-based portion may register for time-based triggering. If the model includes a state-based portion that is registered for time-based triggering, and the state-based portion has not already executed during the current time step, then the model execution engine 208 may execute the state-based portion, as indicated at block 642.

At this point, execution during the current time step may be complete. If the current time step does not equal the simulation end time, the current time step may be incremented and the execution process may be repeated. This process, for example steps 622 to 640, may be repeated for each time step between the simulation start time and the simulation end time.

Referring to model 700 (FIGS. 7A and 7B), execution at each time step may proceed as follows. Time-based Constant and Gain blocks 710 and 712 may execute first as they may be the first blocks in the sorted order. The signal output of Gain block 712 may be a trigger event for the state-based portion 706. Accordingly, after Gain block 712 executes, execution of other time-based components may be suspended, and the state-based portion 706 may be executed. The Message Receiver block 736 is configured to listen for a message from the state-based portion 706 on input port 748. If the execution of the state-based portion 706 results in the generation and sending of this message, the message is received by Message Receiver block 736 causing it to be executed. Next, the blocks of the second time-based portion 704 execute following the completion of execution of the Message Receiver block 736, assuming it executes. Execution of the second time-based portion 704 results in the generating and sending of a message that is received by the Message Generator block 732. If the second time-based portion 704 is configured as an atomic subsystem, then all of its blocks, including Gain block 722 and Outport block 724 will execute before the Message Generator block 732 executes. On the other hand, if the second time-based portion 704 is not configured as an atomic subsystem, then the Message Generator block 732 may execute before execution of the Gain block 722 and Outport block 724.

If the execution of the Message Generator block 732 results in the generation and sending of a message, then the Message Buffer block 734 may execute, as it is triggered by such a message. If the execution of the Message Buffer block 734 results in the generation and sending of a message, then the state-based portion 706 may execute again.

At this point, execution of the current time step may be complete. The model execution engine 208 may increment the time step and execute the model 700 again, unless the simulation end time has been reached.

Verification of a Message-Based Portion of a Model

In a further aspect of the invention, verification or other testing may be performed on one or more message-based portions of a model. In an embodiment, one or more verification components may be provided to verify a message-based portion of a model.

Message Observer

In an embodiment, the verification engine 218 may create a first verification component, which may be referred to as an observer, for verifying one or more messages in a model. The observer may be associated with a particular message-based connection in a model, and may present information concerning one or more of the messages that travel across that connection during execution of the model. In an embodiment, the observer component operates, at least in part, as a viewer to present information concerning all of the messages that travel across the selected connection during execution of the model. The observer component may provide a message-based view that includes the set of message participants, such as the sources and destinations, the types of messages generated and sent, and the payloads of those message. This collection of information may be referred to as an interaction.

Figure 8:
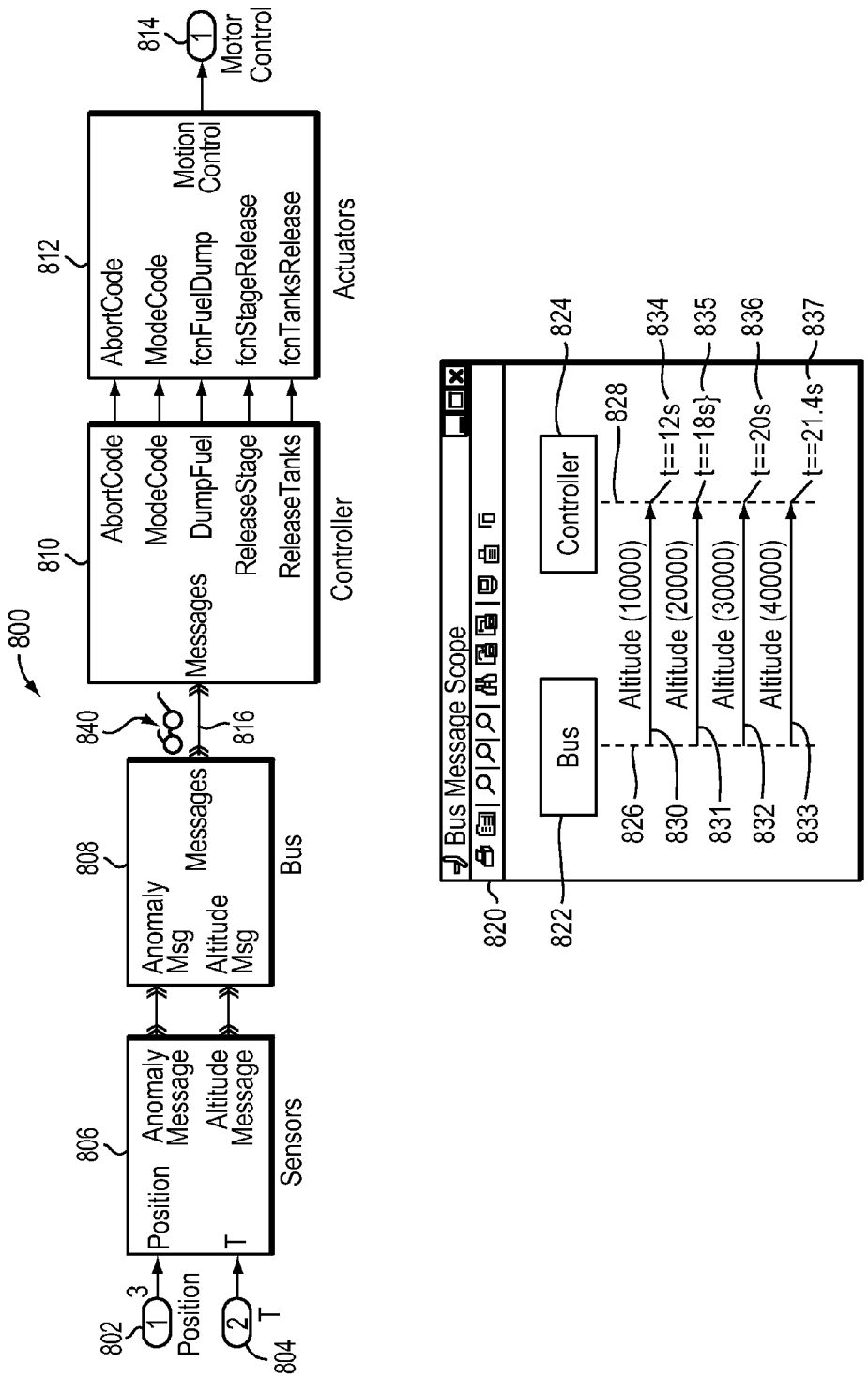
FIG. 8 is; an illustration of a graphical model having executable semantics.

FIG. 8 is a schematic illustration of a graphical model 800 having executable semantics. The model 800 includes a plurality of interconnected components. Specifically, the model 800 has two Inports 802, 804, a Sensors component 806, a Bus component 808, a Controller component 810, an Actuators component 812, and an Outport 814. The Inports 802, 804 and the Outport 814 may be time-based components, while the Sensors, Bus, Controller, and Actuators components 806, 808, 810, 812 may be message-based components. In addition, the Bus component 808 and the Controller component 810 may be connected by a message-based connection 816. Exemplary embodiments may allow one or more messages to be sent by the Bus component 808 and received by the Controller component 810 during execution of the model 800 when the Bus component 808 is connected to the Controller component 810 using a message-based connection. In addition, the Controller component 810 may generate and send one or more reply messages to the Bus component 808.

Suppose a user is interested in examining and verifying the actual messages exchanged between the Bus component 808 and the Controller component 810 across the message-based connection 816 during execution of the model 800. In this case, the user may access an Observer component, such as Observer component or block 820.

Figure 9A:
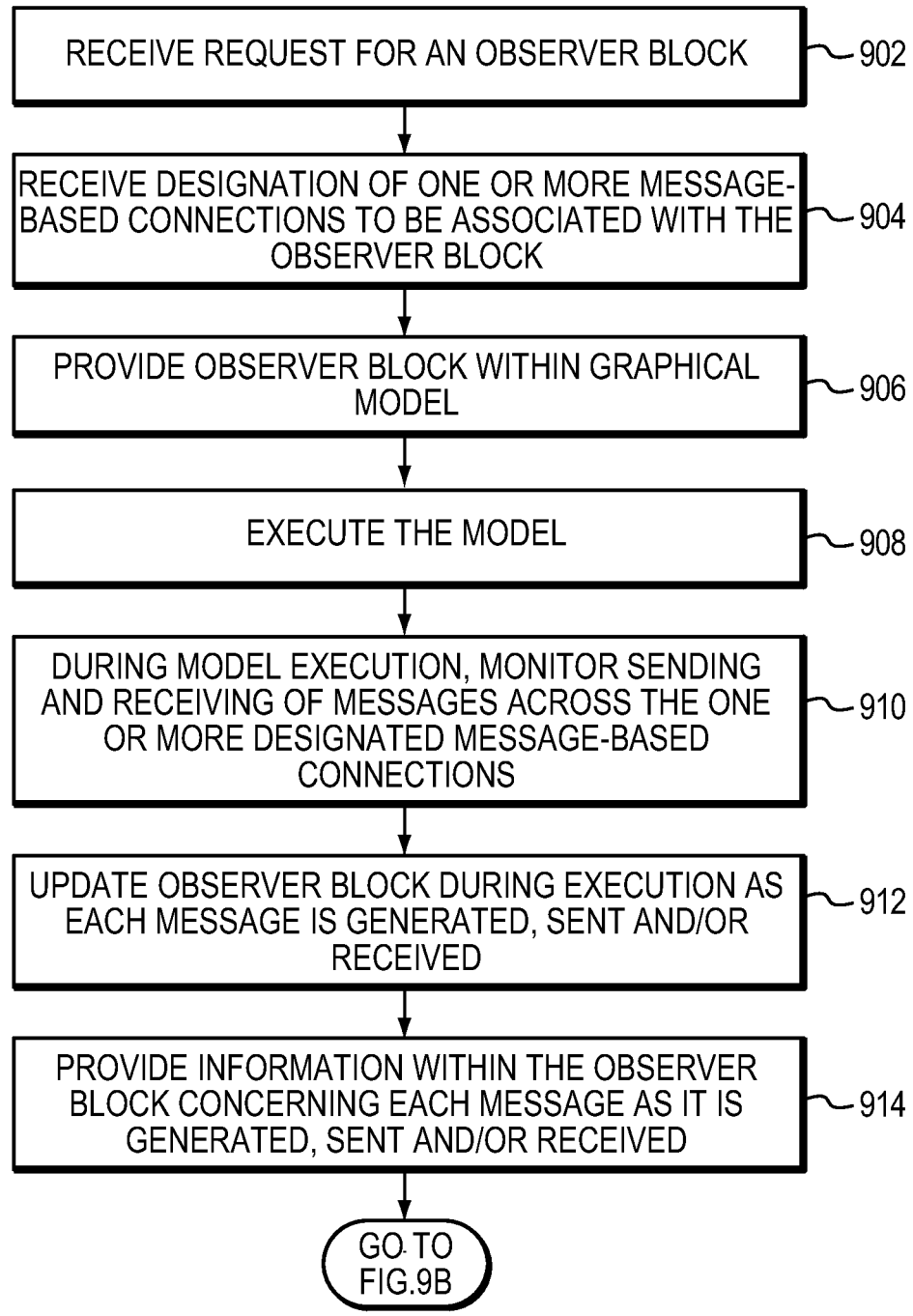
FIGS. 9A and B are a flow diagram of exemplary processing that can be used in accordance with an embodiment of the invention.

FIGS. 9A and B are a flow diagram illustrating exemplary processing in accordance with an embodiment of the invention.

The verification engine 218 may receive a request for an Observer block, as indicated at block 902. The verification engine 218 may also receive a designation of one or more message-based connections to which the requested Observer block is to be associated, as indicated at block 904. In response to the request, the verification engine 218 may cooperate with the constructor 224 to create an Observer component, such as an object instance. In addition, the model builder 210 may present a corresponding Observer block, such as block 820, in the graphical model 800, as indicated at block 906. A user may issue a request for an Observer block either textually, e.g., by entering a command in a Command Line Interface (CLI), or graphically, e.g., by selecting an Observer block from a library browser. In an embodiment, a user may select a message-based connection of interest, for example, connection 816, such as with the mouse 118. In response, the verification engine 218 may present one or more selectable commands in a drop-down list, including an 'Insert Observer Block' command. The user may select the 'Insert Observer Block' command, thereby causing an Observer component to be created that is associated with the selected message-based connection.

In an embodiment, the Observer block 820 may include a plurality of Graphical User Interface (GUI) elements. Specifically, the Observer block 820 may include corresponding icons for the two or more message-based participants, e.g., the components connected by the message-based connection to which the Observer block is associated. Here, the Observer block 820 may include a first box element 822 representing the Bus component 808, and a second box element 824 representing the Controller component 810. The Observer block 820 may also include a line element, such as line elements 826, 828 extending from each box element 822, 824. Information concerning messages exchanged between the Bus component 808 and the Controller component 810 across message-based connector 816 may be presented between the line elements 826, 828 of the Observer block 820.

After issuing a request for an Observer block and associating it with a message-based connection of interest, the model may be executed, as indicated at block 908. As part of the execution of the model 800, the Bus component 808 may generate and send one or more messages to the Controller component 810, and the Controller component 810 may respond with one or more reply messages. Information concerning this exchange of messages may be presented by the Observer block 820.

Specifically, the verification engine 218 may monitor the sending and receiving of messages across the selected message-based connector 816, as indicated at block 910. For example, the verification engine 218 may interface with the message-based execution engine 216. In addition, as each such message is generated and sent, the verification engine 218 may add an entry to the Observer block for that message, as indicated at block 912. The verification engine 218 may also include within each entry one or more information elements concerning the respective message, as indicated at block 914. For example, the verification engine 218 may add an arrow element to the Observer block 820 for each actual message. An arrow pointing from line element 826, which extends from box element 822, to line element 828, which extends from box element 824, may represent a message sent from the Bus component 808 to the Controller component 810. An arrow pointing from line element 828 to line element 826 may represent a reply message sent from the Controller component 810 to the Bus component 808. The verification engine 218 may also include a data element at each entry that indicates the type of message sent, and that includes information from the message's payload. The entire payload or a portion thereof may be included in the entry's data element.

In addition, the verification engine 218 may include one or more time elements in the entry for a given message. The one or more time elements may contain information relating to the timing characteristics of the message. In particular, a message may be sent by a source component at a particular time, which may be denoted as the TimeSent, $T_S$, and may be received by a destination component at a particular time, which may be denoted as TimeReceived, $T_R$. One or more of these timing characteristics, such as $T_S$ and/or $T_R$, may be included in the entry of the Observer block 820 by the verification engine 218.

The timing characteristics of a message may be determined by the verification engine 218 in cooperation with the message-based execution engine 216. For example, system 202 may receive a clock signal from system clock 212, and the message-based execution engine 216 may use this clock signal to identify one or more timing characteristics of messages.

As illustrated in the Observer block 820, four messages were generated and sent across the message-based connection 816 during execution of the model 800, as indicated by arrow elements 830-833. All four messages were sent by the Bus component 808 to the Controller component 810 as indicated by the arrow elements 830-833. Furthermore, each of the four messages may be 'Altitude' type messages, and may carry the following payloads: '10,000', '20,000', '30,000, and '40,000'. In addition, the four messages were received by the Controller component 810 at the following times: 12 s, 18 s, 20 s, and 21.4 s, as indicated by timing elements 834-837 of the Observer block 820.

Figure 9B:
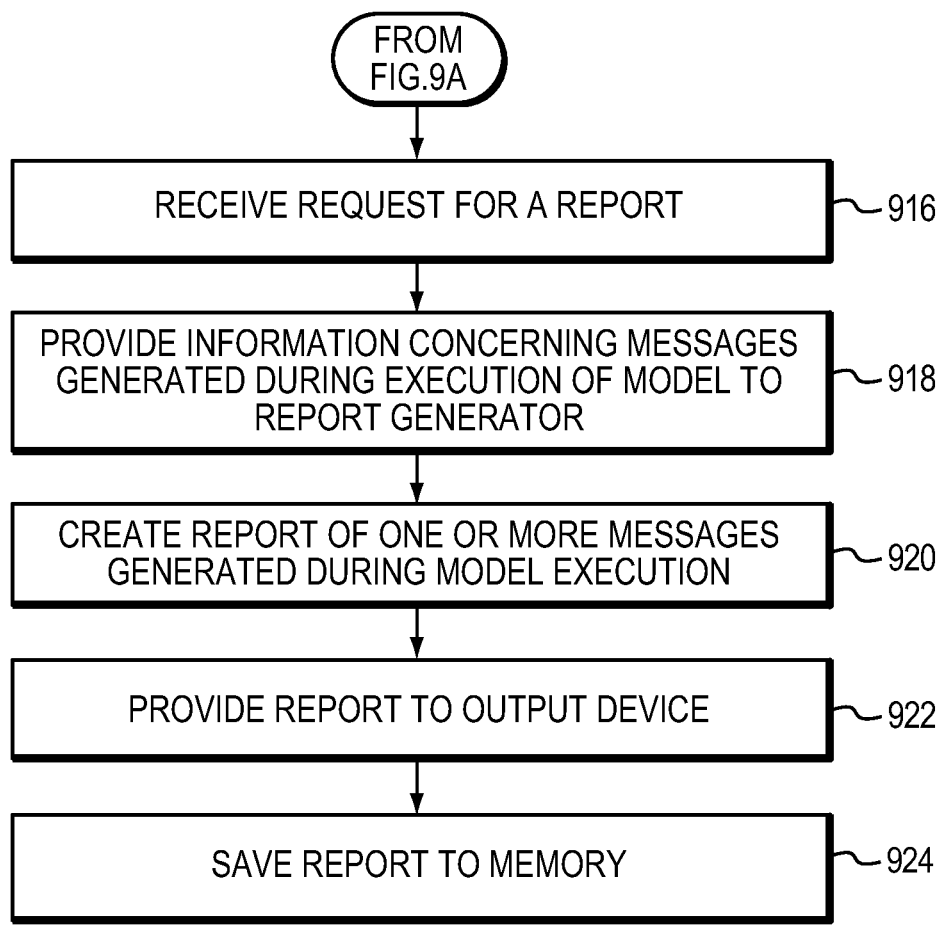

The verification engine 218 may also receive a request for a report of the messaging information presented by the Observer block 820, as indicated at block 916 (FIG. 9B). For example, a user may request such a report. The verification engine 218 may provide the information to the report generator 220, as indicated at block 918, and the report generator 220 may create a report, as indicated at block 920. The report generator 220 may provide the report to an output device, such as the display 120, a printer, etc., as indicated at block 922. The report generator 220 may also or alternatively save the report in memory, as indicated at block 924.

The Observer block 820 may be docked, that is fixed, to the model 800. The Observer block 820 also may be visually associated with the message-based connection 816 through a line element (not shown) connecting the Observer block 820 to the connection 816. Alternatively, the Observer block 820 may be a floating block. A floating block is not locked to any particular location in the model 800, but may be moved around the canvas, for example, by the user. In this case, an icon, such as a glasses element 840, may be placed near the connection 816 to indicate that an Observer block is associated with this message-based connection.

Message Source Block

The verification engine 218 may create a second verification block referred to as a Message Source block. The Message Source block may be connected to a destination component of a model through one or more message-based connections. The Message Source block may be used to define one or more messages, and these messages may be sent from the Message Source block to the destination block during execution of the model.

Figure 10:
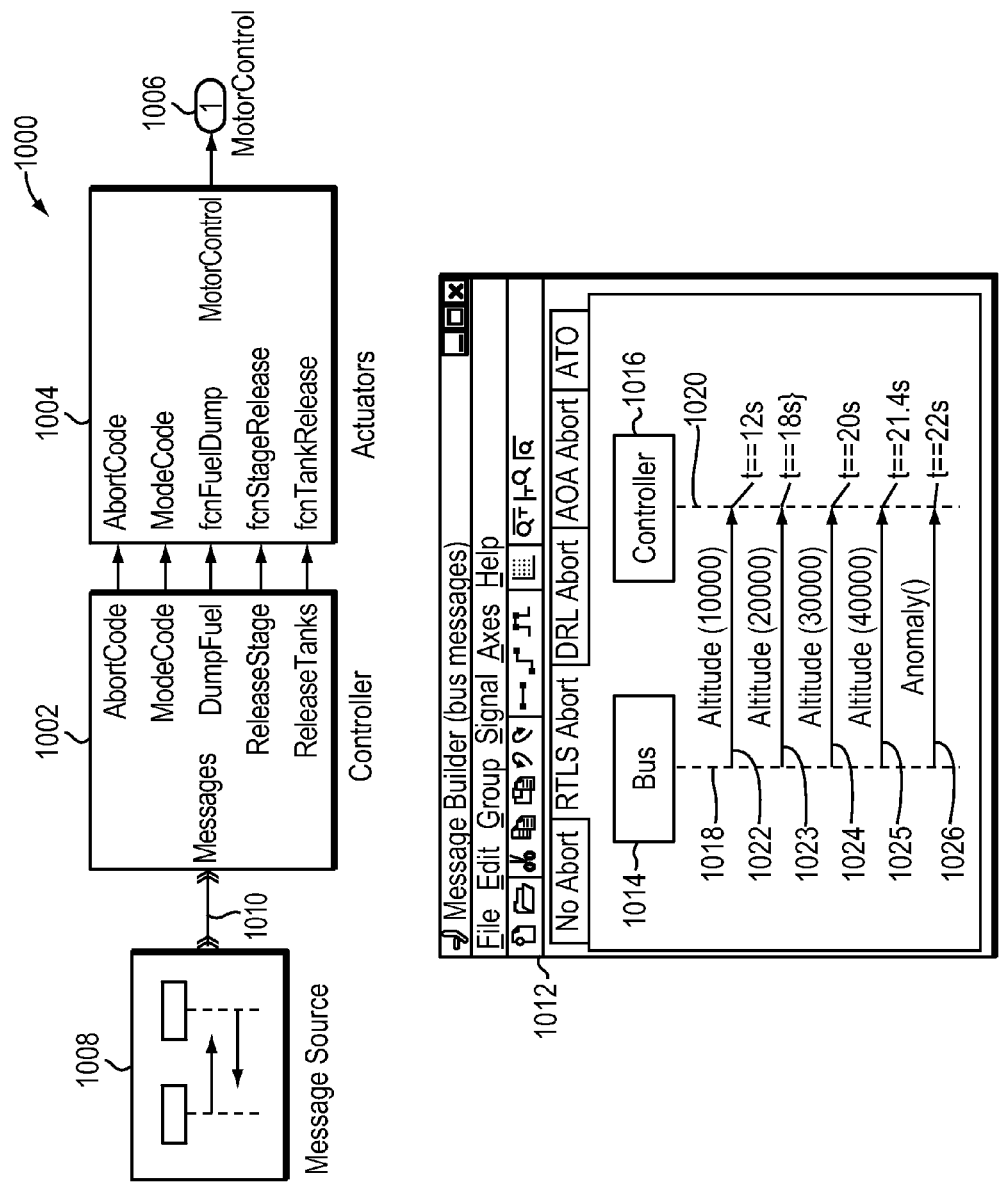
FIG. 10 is an illustration of a graphical model having executable semantics.

FIG. 10 is a schematic illustration of a graphical model 1000 having executable semantics. The model 1000 includes a Controller component 1002, an Actuators component 1004, and an Outport component 1006. The Controller and Actuators components 1002, 1004 may be message-based blocks, and the Outport component 1006 may be a time-based block. Suppose the model 1000 is intended to be used in a larger model in which the Controller component 1002 will receive one or more messages. Suppose further, that a user wants to verify the operation of the model 1000 when the Controller component 1002 receives these one or more messages. The user may add a Message Source component or block to the model 1000, such as Message Source block 1008, and may connect it to the Controller component 1002 using a message-based connection 1010. A Generator block 1012 that is associated with the Message Source block 1008 also may be created by the verification engine 218. In an embodiment, the Message Source block 1008 and the Generator block 1012 may be combined into a single block, which may be referred to as a Message Source block. A Message Source block may be used to simulate the one or more messages that the Controller component 1002 would have received as part of the larger model. In this way, a user may test the operation of the Controller component 1002 and/or the model 1000.

Figure 11:
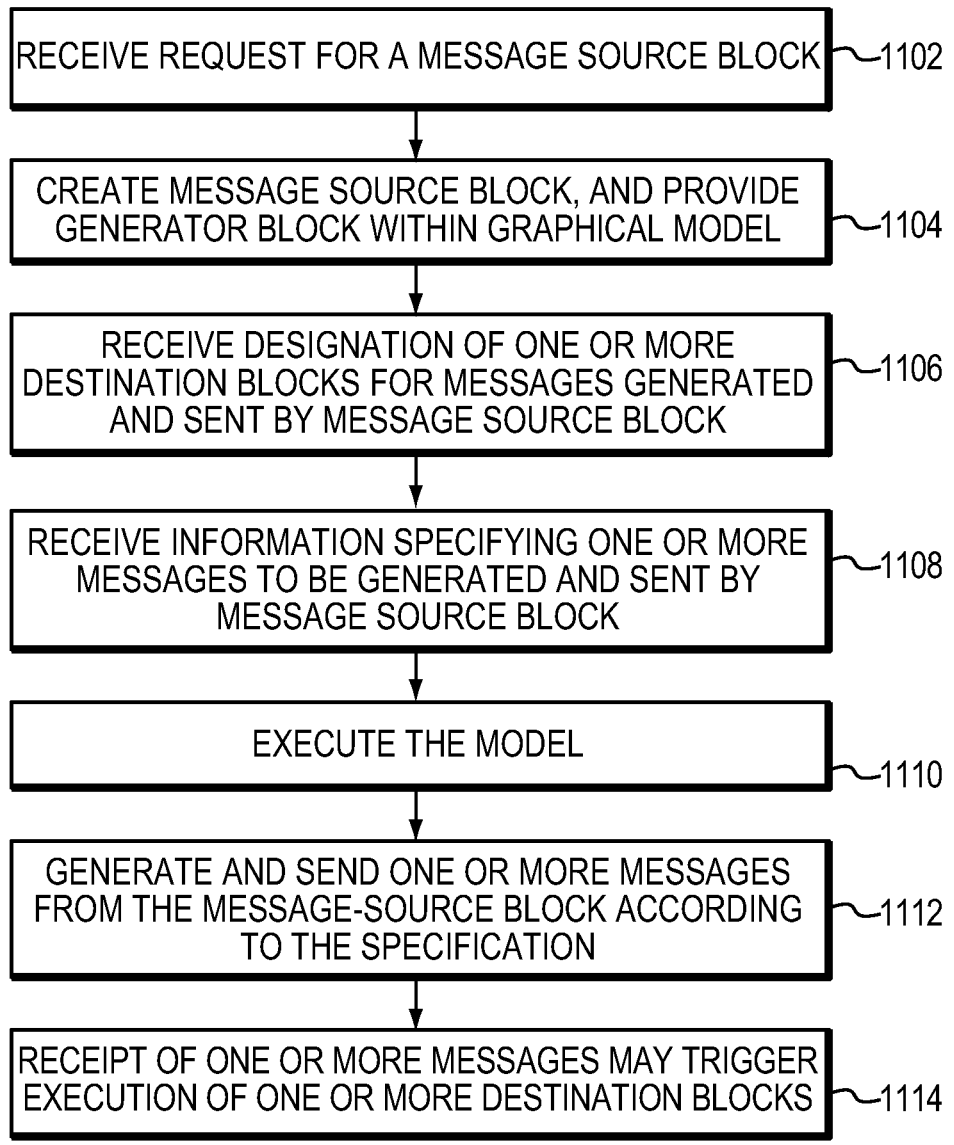
FIG. 11 is a flow diagram of exemplary processing that can be used in accordance with an embodiment of the invention.

FIG. 11 is a flow diagram of exemplary processing that can be used in accordance with an embodiment of the invention.

The verification engine 218 may receive a request for a Message Source block, as indicated at block 1102. In response, the constructor 224 may create an instance of a Message Source block, and the model builder 210 may present a Message Source block and a Generator block on the canvas, as indicated at block 1104. The verification engine 218 may also receive a designation of one or more destination blocks that are to receive messages generated and sent by the Message Source block, as indicated at block 1106. The verification engine 218 may provide one or more GUI elements within the Generator block 1012 for receiving information that defines one or more messages to be generated and sent by the Message Source block 1008. For example, the verification engine 218 may include a system boundary box element 1014, and a Controller box element 1016 in the Generator block 1012. The verification engine 218 also may include a first line element 1018 extending from the system boundary box element 1014, and a second line element 1020 extending from the Controller box element 1016. Information defining one or more messages may be entered, for example by the user, between the first and second line elements 1018, 1020. For example, a user may draw an arrow element, e.g., using the mouse 118, from first line element 1018 to the second line element 1020, thereby defining a first message to be generated and sent to the Controller component 1002 during execution of the model 1000. The user may enter information specifying the type of message, its lifetime, and its payload. The user may also specify one or more timing characteristics, such as when each message is to be sent. For example, the user may indicate that a respective message is to be generated and sent during each time step of the model's execution. Alternatively, the user may specify that a respective message is to be sent once during the execution of a model, such as during a designated particular time step. As the user enters information defining one or more messages in the Message Source block, this information may be received by the verification engine 218, as indicated at block 1108.

For example, a first arrow element 1022 may be added to define a first message of type 'Altitude' having a payload of '10,000', and a message send time of 12 s. A second arrow element 1023 may be added to define a second message of type 'Altitude' having a payload of '20,000', and a message send time of 18 s. A third arrow element 1024 may be added to define a third message of type 'Altitude' having a payload of '30,000', and a message send time of 20 s. A fourth arrow element 1025 may be added to define a fourth message of type 'Altitude' having a payload of '40,000', and a message send time of 21.4 s. A fifth arrow element 1026 may be added to define a fifth message of type 'Anomaly' with a message send time of 22 s.

Once the desired messages have been defined, the model 1000 may be executed, as indicated at block 1110. During execution of the model 1000, the verification engine 218 may cooperate with the execution engine 216 to cause the one or more messages defined in the Generator block 1012 to be generated and sent by the Message Source block 1008 at the specified times, where the messages are of the specified type and carry the specified payloads, as indicated at block 1112. One or more of these messages may trigger execution of the Controller component 1002, as indicated at block 1114.

Message generation time may be specified in absolute terms, for example, from the start of the simulation of a model. In addition, message generation time may be specified relative to a preceding message.

Message Sink Block

The verification engine 218 may create a third verification block referred to as a Message Sink block. The Message Sink block may be connected to a source component of a model through one or more message based connections, and may present information concerning one or more messages generated by the source component during execution of the model. In an embodiment, the Message Sink block operates as a viewer to present information concerning all of the messages generated by the source component during execution of the model.

Figure 12:
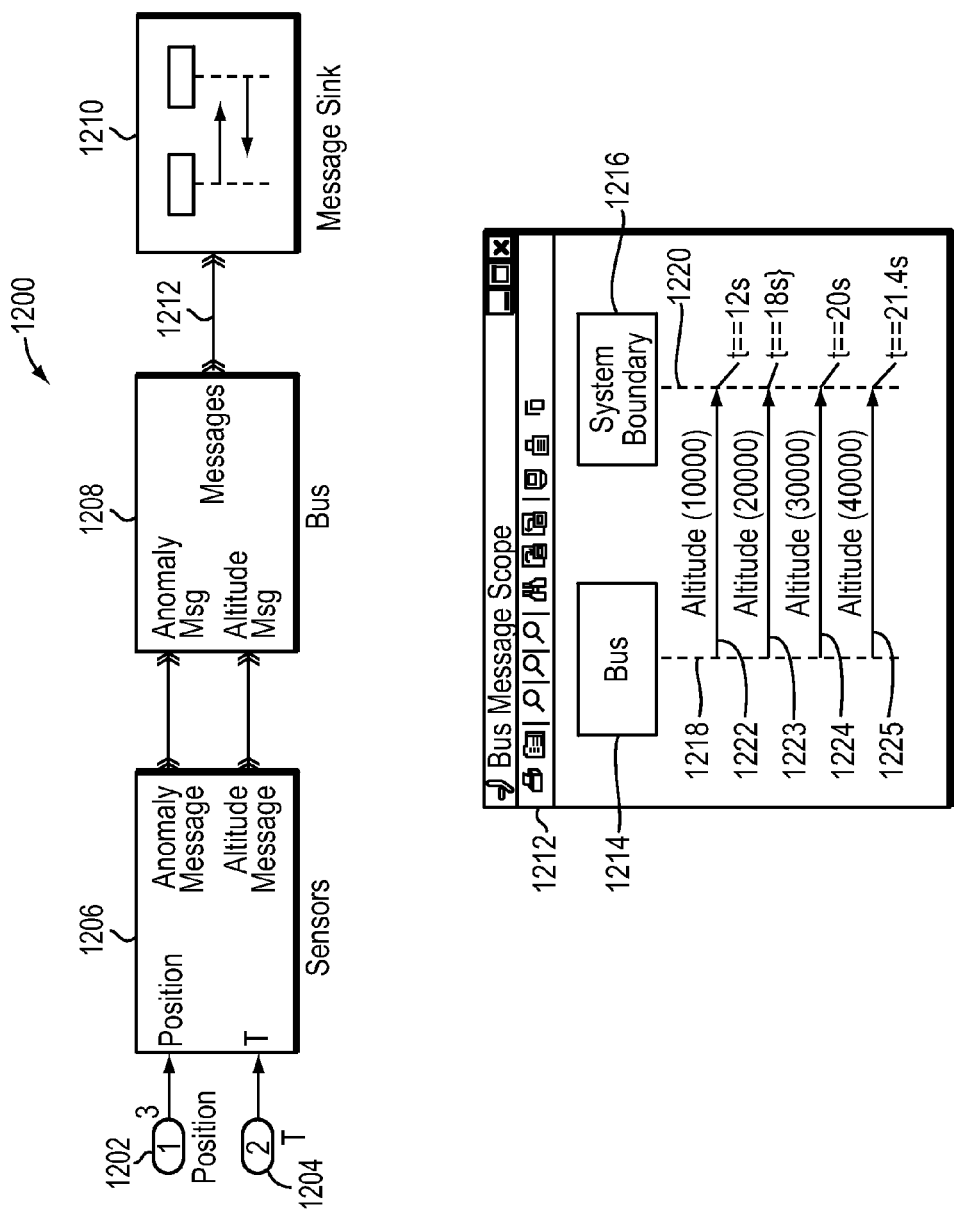
FIG. 12 is an illustration of a graphical model having executable semantics.

FIG. 12 is a schematic illustration of a graphical model 1200 having executable semantics. The model 1200 includes a plurality of interconnected components. Specifically, the model 1200 has two Inports 1202, 1204, a Sensors component 1206, and a Bus component 1208. The Inports 1202, 1204 may be time-based blocks, and the Sensors and Bus components 1206, 1208 may be message-based components. Suppose the model 1200 is intended to form part of a larger model, and that the Bus component 1208 is intended to generate and send one or more messages to one or more components of this larger model. Suppose further that a user wants to verify the messages being generated and sent by the Bus component 1208. The user may add a Message Sink block, such as Message Sink block 1210, to the model 1200. The user may also connect the Message Sink block 1210 to the Bus component 1208 with a message-based connection 1212. A Message Viewer block 1212 that is associated with the Message Sink block 1210 also may be created by the verification engine 218. In an embodiment, the Message Sink block 1210 and the Message Viewer block 1212 may be combined into a single block, which may be referred to as a Message Sink block. The Message Viewer block 1212 may be an instance of an Observer block.

Figure 13A:
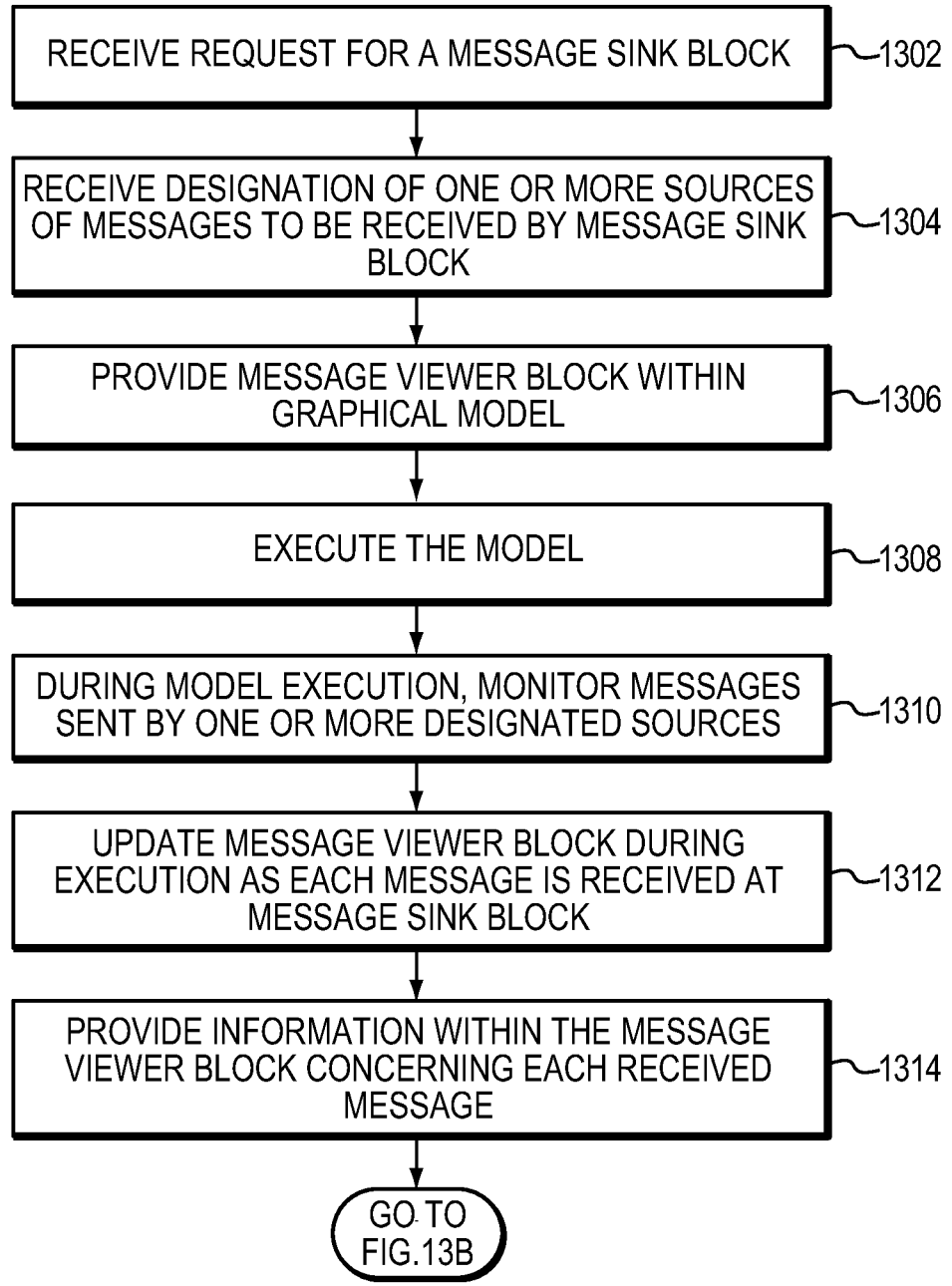
FIGS. 13A and B are a flow diagram of exemplary processing that can be used in accordance with an embodiment of the invention.

FIG. 13 is a flow diagram illustrating exemplary processing that can be used in accordance with an embodiment of the invention.

The verification engine 218 may receive a request for a Message Sink block, as indicated at block 1302. The verification engine 218 may also receive a designation of one or more message sources for the Message Sink block, as indicated at block 1304. In response to the request, the constructor 224 may create a Message Sink object instance, and the model builder 210 may present a corresponding Message Source block and a Message Viewer block in the graphical model 1200, as indicated at block 1306. A user may issue a request for a Message Source block either textually, e.g., by entering a command in a Command Line Interface (CLI), or graphically, e.g., by selecting it from a library browser.

In an embodiment, the Message Viewer block 1212 may include a plurality of GUI elements. Specifically, the Message Viewer block 1212 may include a first box element 1214 for the message source, i.e., the Bus component 1208, and a second box element 1216 for a system boundary. The Message Viewer block 1212 may also include a first line element 1218 extending from the first box element 1214, and a second line element 1220 extending from the second box element 1216. Information concerning messages generated and sent by the Bus component 1208 may be presented between the first and second lines 1218, 1220 of the Message Viewer block 1212.

After requesting the Message Sink block 1210 and connecting it to the source of interest, the model 1200 may be executed, as indicated at block 1308. As part of the execution of the model 1200, the Bus component 1208 may generate and send one or more messages.

The verification engine 218 may monitor the generating and sending of messages by the Bus component 1208, as indicated at block 1310. In addition, as each such message is generated and sent, the verification engine 218 may add an entry to the Message Viewer block 1212 for that message, as indicated at block 1312. The verification engine 218 may also include one or more information elements for each entry added to the Message Viewer block 1212, as indicated at block 1314. These information elements may provide additional information on the messages. Specifically, each entry may include an arrow element extending from the first line element 1218 to the second line element 1220, thereby indicating that the message was sent by the Bus component 1208. Each entry may also identify the type of message, and may include information from the message's payload. The entire payload or a portion thereof may be included in the respective entry in the Message Viewer block 1212. One or more entries may also include one or more time elements that provide information concerning the timing characteristics of the respective message, such as the time the message was sent, $T_S$, and/or the time the message was received, $T_R$.

For example, a first arrow element 1222 may be presented in the Message Viewer block 1212 during execution of the model 1200 by the verification engine 218 indicating that a first message of type 'Altitude' having a payload of '10,000', was sent by the Bus component 1208 at time 12 s. A second arrow element 1223 may be presented indicating that a second message of type 'Altitude' having a payload of '20,000', was sent at time 18 s. A third arrow element 1224 may be added indicating that a third message of type 'Altitude' having a payload of '30,000', was sent at time of 20 s. A fourth arrow element 1225 may be presented indicating that a fourth message of type 'Altitude' having a payload of '40,000', was sent at time of 21.4 s.

Figure 13B:
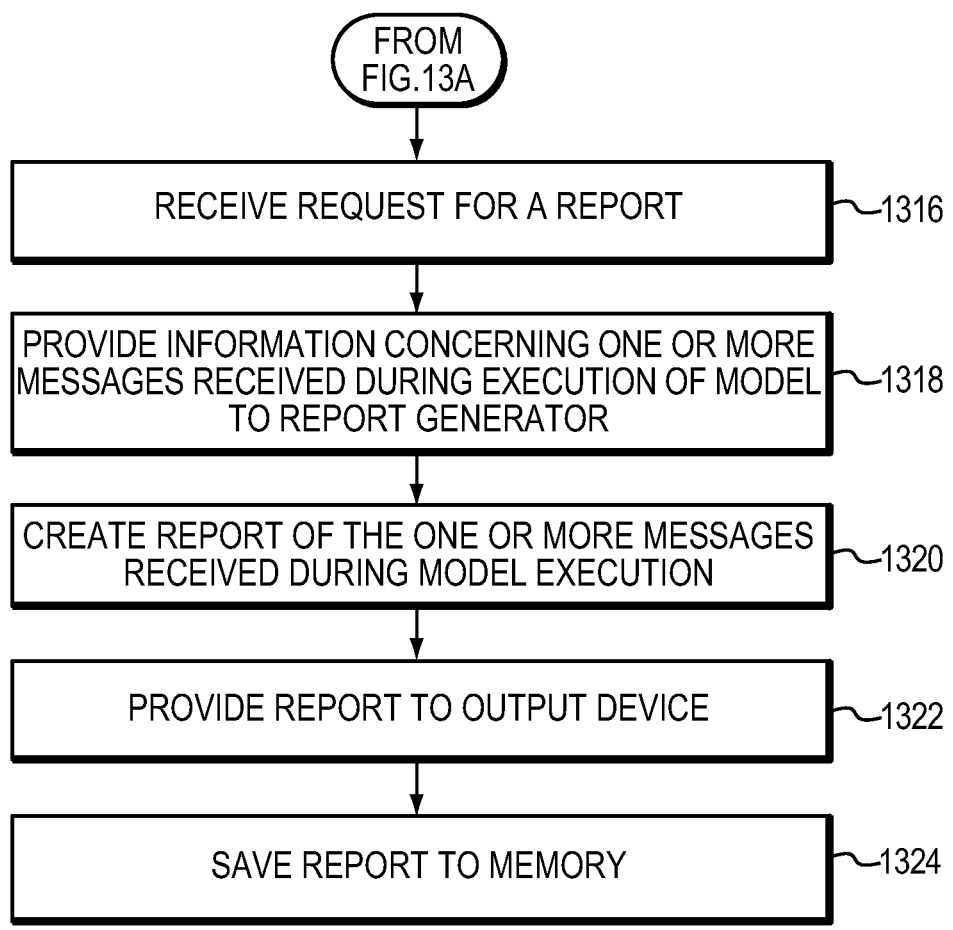

The verification engine 218 may also receive a request for a report of the message information captured by the Message Sink block 1210 and/or presented in the Message Viewer block 1212, as indicated at block 1316 (FIG. 13B). For example, a user may request such a report. The verification engine 218 may pass the information to the report generator 220, as indicated at block 1318, and the report generator 220 may create a report, as indicated at block 1320. The report generator 220 may provide the report to an output device, such as the display 120, a printer, etc., as indicated at block 1322. The report generator 220 may also or alternatively save the report in memory, as indicated at block 1324.

Message Scenario Block

The verification engine 218 may create a fourth verification block referred to as a Scenario block. The Scenario block may be connected to one or more message-based connections. In addition, a Scenario block may include a specification of one or more valid and/or invalid interactions. That is, the specification may define the messages that are expected to be exchanged on the one or more message-based connections that have been associated with the Scenario block. A set of messages in a particular order may be referred to as a trace. The Scenario block may also include one or more constraints on the expected messages. When the model is executed, the verification engine 218, based on information contained in the Scenario block, may determine whether the messages actually generated during execution are equivalent to the expected messages and/or satisfy the one or more constraints. If not, the verification engine 218 may take one or more actions, such as suspending the execution of the model, stopping execution of the model, issuing an alert, outputting the non-conforming message or trace, generating a new scenario block whose specification corresponds to the non-conforming message or trace, etc. The Scenario block may also display information concerning the actual messages generated during execution of the model.

Figure 14:
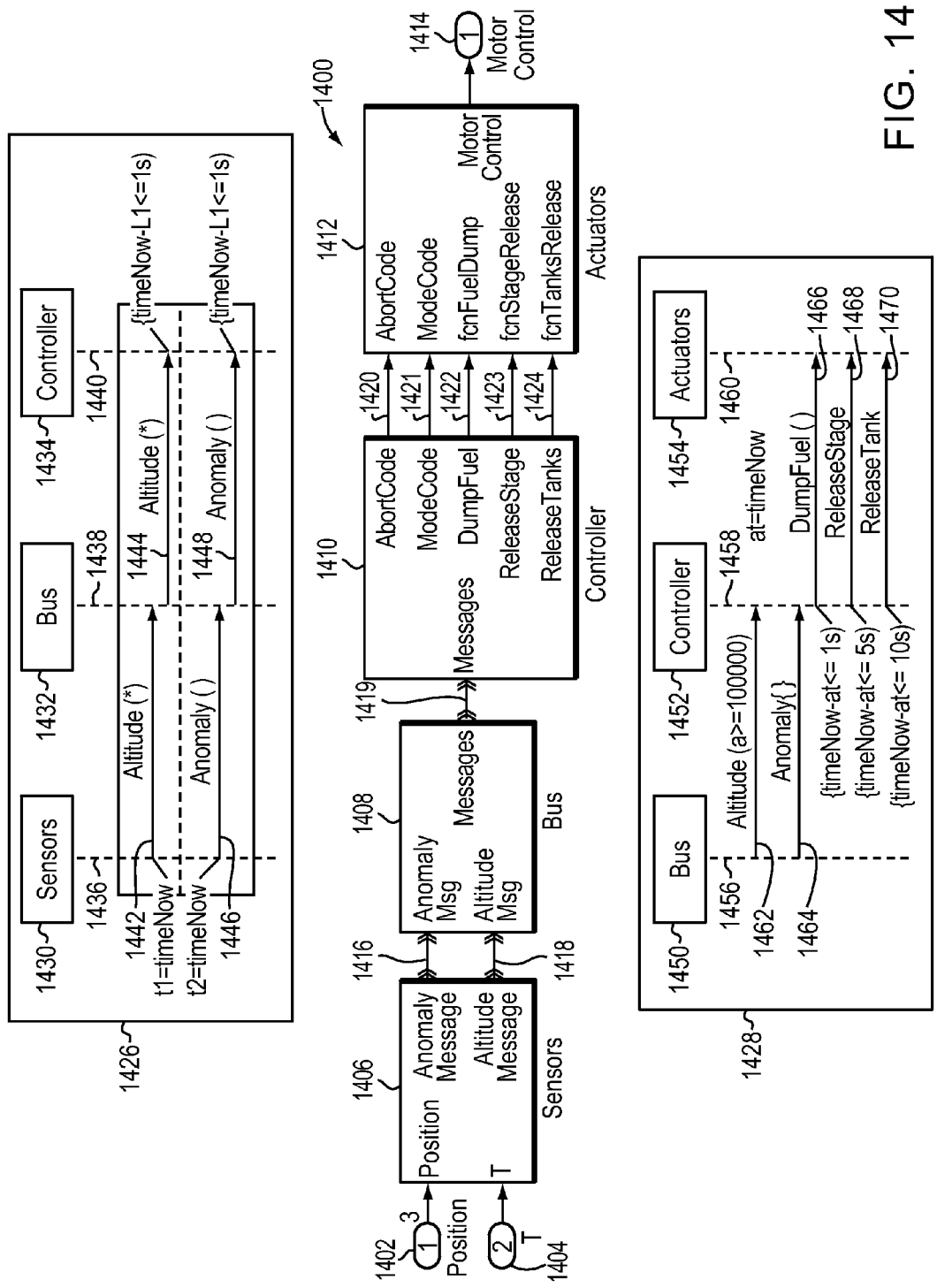
FIG. 14 is an illustration of a graphical model having executable semantics.

FIG. 14 is a schematic illustration of a graphical model 1400 having executable semantics. The model 1400 includes a plurality of interconnected components. Specifically, the model 1400 has two Inports 1402, 1404, a Sensors component 1406, a Bus component 1408, a Controller component 1410, an Actuators component 1412, and an Outport 1414. The Inports 1402, 1404 and the Outport 1414 may be time-based blocks, while the Sensors, Bus, Controller, and Actuators components 1406, 1408, 1410, 1412 may be message-based blocks. The Bus component 1408 may be connected to the Sensors component 1406 by two message-based connections 1416, 1418. The Controller component 1410 may be connected to the Bus component 1408 by a message-based connection 1419. The Actuators component 1412 may be connected to the Controller component 1410 by five message-based connections 1420-1424.

Figure 15A:
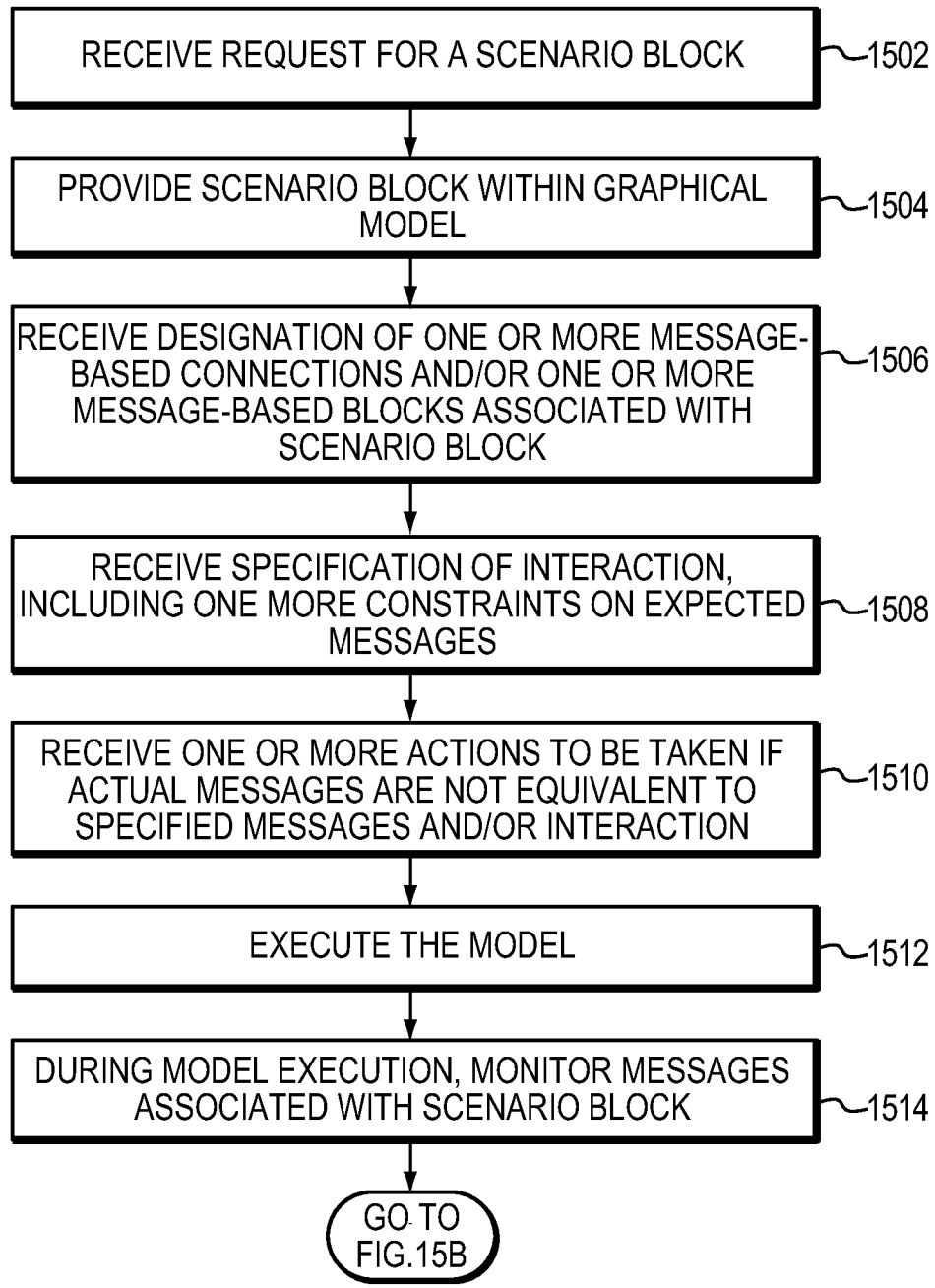
FIGS. 15A and B are a flow diagram of exemplary processing that can be used in accordance with an embodiment of the invention.

FIG. 15 is a flow diagram illustrating exemplary processing that can be used in accordance with an embodiment of the invention.

The verification engine 218 may receive a request for one or more Scenario blocks to be added to a model, as indicated at block 1502. Suppose, for example, a user is interested in evaluating the manner in which the Bus component 1408 and the Controller component 1410 process messages. The user may request a first Scenario block to evaluate the messages generated and received by the Bus component 1408, and a second Scenario block to evaluate the messages generated and received by the Controller component. The user may issue a request for a Scenario block graphically, textually or through a combination of textual and graphical inputs to the high-level modeling environment. For example, a user may select a Scenario block from a library browser.

In response, the constructor 224 may create an instance of a Scenario object, and the model builder 210 may add a Scenario block to the model canvas displaying the model, as indicated at block 1504. Specifically, the verification engine 218 may add first and second Scenario blocks 1426, 1428 to the model 1400. The verification engine 218 may also receive a designation of one or more message-based components to be associated with each Scenario block, as indicated at block 1506. For example, a user may associate the first Scenario block 1426 with the messages corresponding to message-based connections 1416, 1418, and 1419. The user may also associate the second Scenario block 1428 with the messages corresponding to message-based connections 1419 and 1422-1424.

The verification engine 218 may receive information specifying an interaction, as indicated at block 1508. That is, the verification engine 218 may receive information concerning the messages expected to be generated and sent during model execution. In an embodiment, a Scenario block may include a plurality of GUI elements for receiving information specifying an interaction. For example, because it is associated with message-based connections 1416, 1418, and 1419, the first Scenario block 1426 may include a Sensors box element 1430, a Bus box element 1432, and a Controller box element 1434. A line element, such as line elements 1436, 1438, and 1440 may extend from each box element 1430, 1432, and 1434, respectively. A user may specify one or more expected messages by drawing arrow elements between line elements 1436, 1438, and 1440. The specification may include the type of message, its payload, and its timing characteristics, among other information. For example, the user may specify the sending of an Altitude type message from the Sensors component 1406 to the Bus component, as indicated by arrow element 1442, and the sending of an Altitude type message from the Bus component 1408 to the Controller component 1410, as indicated by arrow element 1444.

The user may also specify one or more constraints for the expected messages. For example, the user may specify that the second altitude message 1444 is to be received by the Controller component 1410 within 1.0 seconds of when the Sensors component sends the first altitude message 1142. The specification of this timing constraint may be performed by the user at the first Scenario block 1426. For example, the user may specify a time sent, $T_S$, value of 'timeNow' for the sending of the first altitude message 1442 by the Sensors component 1406 at the tail of the arrow element 1442 where it joins line element 1436. The user may also specify a time receive, $T_R$, value of 'timeNow<=1 sec.' for the receipt of the second altitude message 1444 by the Controller component 1410 at the head of arrow element 1444 where it joins line element 1440. Alternative embodiments may allow constraints to be programmatically specified by system 100.

The user may specify that two anomaly messages are expected as represented by arrow elements 1446 and 1448, and that the second anomaly message 1448 should be received by the Controller component 1434 within 0.1 seconds of when the first anomaly message is sent by the Sensors component 1406.

It should be understood that a determined order of the messages may be specified, for example, by a user or programmatically. The determined order may be specified within the Message Scenario block, and may be a sequential order.

A Scenario block may receive additional constraints besides or in addition to constraints concerning the ordering and timing of messages.

The information specified in a Message Scenario block, such as the source and destination components, message types, payloads, and constraints, may be referred to as an interaction. Other techniques besides or in addition to the use of arrow and other GUI elements may be used to specify an interaction or one or more parts thereof, for example one or more textual inputs may be used.

The second Scenario block 1428 may include a Bus box element 1450, a Controller box element 1452, and an Actuators box element 1454, since it is associated with message-based connections 1419 and 1422-1424. A line element, such as line elements 1456, 1458, and 1460, may extend from each box element 1450, 1452, and 1454, respectively. Between line elements 1456, 1458, and 1460, the user may draw arrow elements representing the messages expected to be sent by the Bus component 1408 and received at the Controller component 1410, and the order of those messages. The user may specify a determined order, such as a sequential order, of message occurrence textually and/or graphically, for example, by drawing the arrow elements that represent those messages in a vertically descending order. That is, the message represented by a first arrow element is expected to occur before a second message represented by a second arrow element, if the first arrow element is drawn above the second arrow element in the Scenario block.

As shown in the second Scenario block 1428, a user may draw two arrow elements between lines 1456 and 1458 associated with the Bus and Controller components 1408, 1410. Specifically, the user may draw a first arrow element 1462 representing an Altitude type message with a payload of '10,000', and a second arrow element 1464 representing an Anomaly type message. Following this sequence of messages between the Bus and Controller components 1408, 1410, the user may draw arrow elements representing expected messages between the Controller and Actuators components 1410, 1412. Specifically, the user may draw a third arrow element 1466 representing a 'DumpFuel' type message, a fourth arrow element 1468 representing a 'ReleaseStage' type message, and a fifth arrow element 1470 representing a 'ReleaseTank' type message.

The verification engine 218 may also receive one or more actions that are to be performed if an actual message occurs during the execution of the model 1400 that is not equivalent to the specified interaction, or to one or more constraints specified in a Scenario block, as indicated at block 1510. For example, a user may open a property page (not shown) associated with a Scenario block, and may specify a desired action, e.g., by selecting one or more radio buttons or checkboxes. Actions that may be specified may include stopping the execution of the model, pausing or suspending its execution, until released, e.g., by the user, logging an error, outputting the one or more actual messages, generating a new Scenario block whose specification is the one or more actual messages and using the new Scenario block in the model, and/or presenting an alert. The particular action or actions may be user-settable, for example, through a property page or dialog of the Scenario block.

Figure 15B:
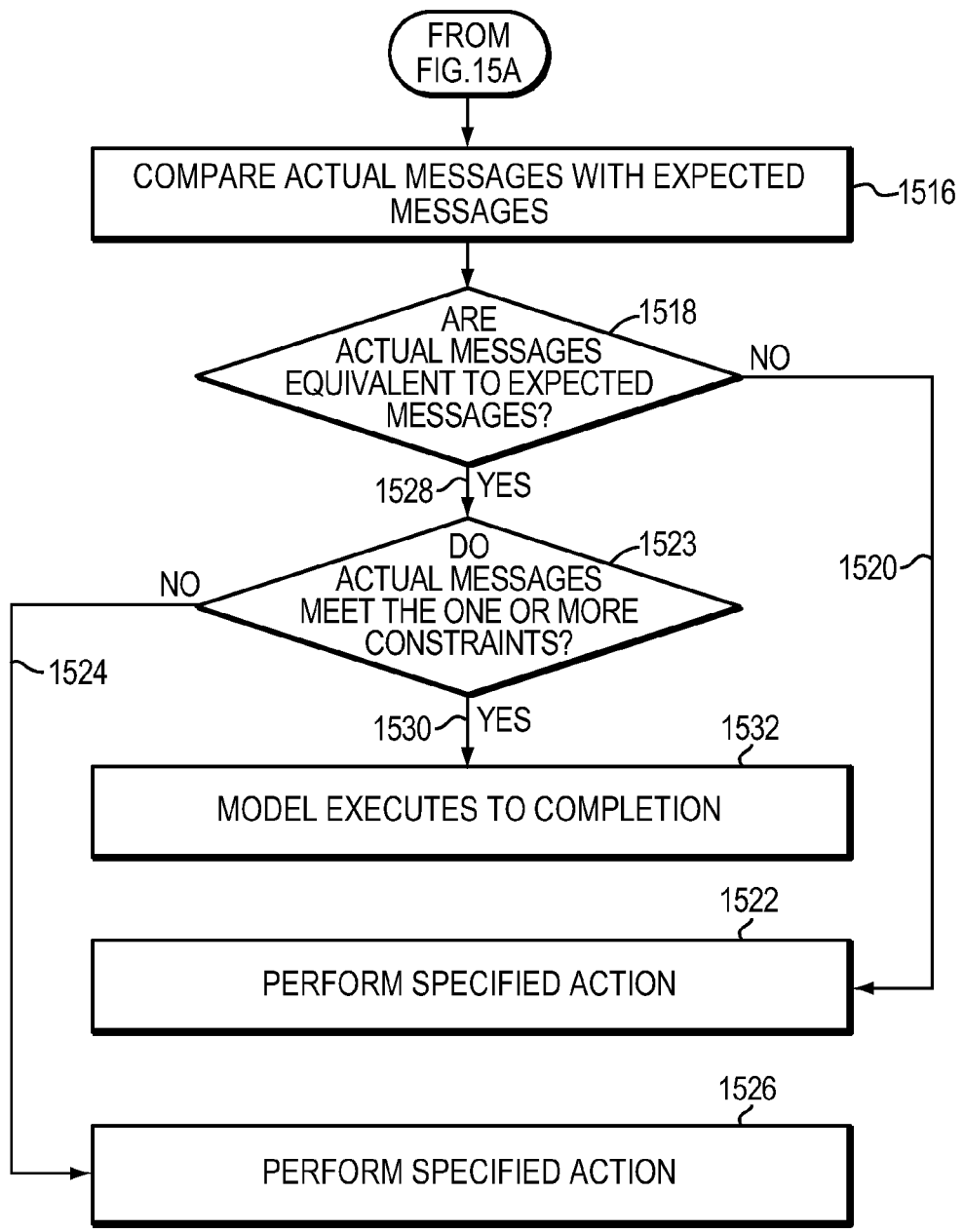

After the one or more Scenario blocks have been configured as desired, e.g., by the user or programmatically, the model 1400 may be executed, as indicated at block 1512. As part of the execution of the model 1400, the Sensors, Bus, and Controller components 1406, 1408, 1410 may generate and send one or more messages. The verification engine 218 may monitor the sending and receiving of messages across the message-based connections that have been associated with the one or more Scenario blocks, as indicated at block 1514. In addition, the verification engine 218 may compare the actual messages that occur during execution of the model 1400 with the interaction contained by the one or more Scenario blocks, as indicated at block 1516 (FIG. 15B). The verification engine 218 may determine whether an actual message occurs that is not equivalent to an expected message as specified by the interaction, as indicated at decision block 1518. If an actual message is not equivalent, the verification engine 218 may perform the specified action, as indicated by No arrow 1520 leading to block 1522. The verification engine 218 may also determine whether an actual message fails to satisfy a constraint specified through a Scenario block, as indicated by decision block 1523. If an actual message does not satisfy a constraint, the verification engine 218 may perform the specified action, as indicated by No arrow 1524 leading to block 1526. It should be understood that the same action may be performed. If the actual messages occur according to the determined order, and satisfy any other specified constraints, the model 1400 may execute to completion, as indicated by Yes arrows 1528, 1530 leading to block 1532. The specified action may include or may be allowing the model to continue execution.

It should be understood that other or different GUI elements may be utilized or supported by one or more of the verification blocks. For example, an additional GUI element may be provided for the Scenario blocks through which a series of looping messages may be specified by a user.

In an embodiment, the high-level modeling environment 200 may include one or more code generation modules for generating code from a model, such as C code, C++ code, Hardware Description Language (HDL) code, etc. The code generation module may generate code for one or more verification blocks, such as the Scenario blocks. If the code for the Scenario block detects an invalid trace, for example, it may generate an error message that could be read by another code module, which in turn may take some predetermined action, such as resetting the deployed systems, or sending a signal to a processing unit.

The generated code, moreover, may be used in a deployed system, that may be a real-world system that is physically separate from the data processing system 100 on which the high-level modeling environment 200 operates. Exemplary deployed systems include controllers, such as Engine Control Units (ECUs) used in cars and trucks, Anti-lock Braking Systems (ABS), aircraft flight control systems, etc.

Suitable code generation models include the Real Time Workshop code generator and the Simulink HDL Coder products from The MathWorks, Inc.

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to the flow diagrams, the order of the acts may be modified in other implementations. Further, non-dependent acts may be performed in parallel. Also, the term "user", as used herein, is intended to be broadly interpreted to include, for example, a computer or data processing system (e.g., system 100) or a user of a computer or data processing system, unless otherwise stated.

Further, certain embodiments of the invention may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 100. The computer-executable instructions may include instructions that implement one or more embodiments of the invention. The tangible non-transitory computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present invention. It will be apparent, however, that other variations and modifications may be made to the described embodiments, with the attainment of some or all of their advantages. For example, one or more message-based blocks, such as a verification block, may be configured through a command line Application Programming Interface (API) that may be provided by the message-based object constructor or the verification engine. Therefore, it is the object of the appended claims to cover all such variations and modifications as come within the true spirit and scope of the invention.

What is claimed is:
1. A computer-implemented method comprising:
   accessing, from a memory, an executable block diagram, at least a portion of the executable block diagram having message-based execution semantics, the at least a portion of the executable block diagram
      including a plurality of interconnected message-based blocks, where the message-based blocks send and receive messages during execution of the block diagram, the messages
         including payloads that remain fixed while the messages travel between respective pairs of the interconnected message-based blocks, and
         persisting for determined execution time intervals, the determined execution time intervals, during which the messages persist, being defined time periods occurring within a simulation time of the executable block diagram that starts with an execution start time and ends with an execution stop time of the block diagram;
   adding an observer block to the executable block diagram, the observer block configured to observe one or more of the messages generated by the message-based blocks;
   executing, by a processor coupled to the memory, the at least a portion of the executable block diagram, the executing producing information associated with the one or more messages being observed by the observer block; and presenting, on a display coupled to the processor, the information associated with the one or more messages being observed by the observer block during the executing of the executable block diagram.

2. The computer-implemented method of claim 1 further comprising:

receiving, for the observer block, a configuration of the one or more messages to be observed by the observer block through either a dialog box associated with the observer block, or a command line Application Programming Interface (API).

3. The computer-implemented method of claim 1 further comprising:

connecting the observer block to one or more of the message-based blocks, the connecting providing a visual indication in the block diagram of the one or more messages to be observed by the observer block.

4. The computer-implemented method of claim 3 wherein the observer block is connected to the one or more of the message-based blocks:

graphically, textually, or a combination of graphically and textually.

5. The computer-implemented method of claim 1 wherein the information associated with the one or more messages is one or more of:

an identifier of a message source block, an identifier of one or more message destination blocks, a message payload, a message type, a time sent of a message, and a time received of a message.

6. The computer-implemented method of claim 1 wherein the payload of a message includes input data, the method further comprising:

receiving a given message by a destination message-based block during execution of the block diagram; and processing, by the destination message-based block, the input data included in the payload of the received given message to produce one or more results.

7. A computer-implemented method comprising:

accessing, from a memory, an executable block diagram, at least a portion of the executable block diagram having message-based execution semantics, the at least a portion of the executable block diagram including a plurality of interconnected message-based blocks, where the message-based blocks send and receive messages during execution of the block diagram, the messages including payloads that remain fixed while the messages travel between respective pairs of the interconnected message-based blocks, and persisting for determined execution time intervals, the determined execution time intervals, during which the messages persist, being defined time periods occurring within a simulation time of the executable block diagram that starts with an execution start time and ends with an execution stop time of the block diagram;

adding a message source block to the executable block diagram, the message source block configured to generate one or more predetermined messages at one or more predetermined times during execution of the block diagram to verify at least a part the block diagram;

configuring one or more of the message-based blocks of the executable block diagram to receive the one or more predetermined messages generated by the message source block during execution of the block diagram; and executing, by a processor coupled to the memory, the at least a portion of the executable block diagram, where the one or more predetermined messages are generated by the message source block, and received by the one or more message-based blocks of the executable block diagram.

8. The computer-implemented method of claim 7 wherein the one or more message-based blocks configured to receive the one or more predetermined messages generated by the message source block execute in response to receiving the one or more predetermined messages.

9. The computer-implemented method of claim 8 wherein the one or more predetermined messages include a predetermined payload including input data, the method further comprising:

processing the input data included in the payload of the one or more predetermined messages by the one or more message-based blocks upon receiving the one or more predetermined messages.

10. A computer-implemented method comprising:

accessing, from a memory, an executable block diagram, at least a portion of the executable block diagram having message-based execution semantics, the at least a portion of the executable block diagram including a plurality of interconnected message-based blocks, where the message-based blocks send and receive messages during execution of the block diagram, the messages including payloads that remain unchanged while the messages are exchanged between respective pairs of the interconnected message based-blocks, and persisting for determined execution time intervals, the determined execution time intervals, during which the messages persist, being defined time periods occurring within a simulation time of the executable block diagram that starts with an execution start time and ends with an execution stop time of the block diagram;

adding a message sink block to the executable block diagram, the message sink block configured to receive one or more messages generated by a selected one of the message-based blocks of the block diagram during execution of the block diagram to verify at least a part of the block diagram;

executing, by a processor coupled to the memory, the at least a portion of the executable block diagram, the executing producing information associated with the one or more messages generated by the selected message-based block; and presenting, on a display coupled to the processor, the information associated with the one or more messages received by the message sink block during the executing of the executable block diagram.

11. The computer-implemented method of claim 10 wherein the information associated with the one or more messages is at least one of:

an identifier of a message source block, a message payload, a message type, a time sent of a message, and a time received of a message.

12. A computer-implemented method comprising:
accessing, from a memory, an executable block diagram, at least a portion of the executable block diagram having message-based execution semantics, the at least a portion of the executable block diagram
including a plurality of interconnected message-based blocks, where the message-based blocks send and receive messages during execution of the block diagram, the messages
including payloads that remain fixed while the messages travel between respective pairs of the interconnected message-based blocks, and
persisting for determined execution time intervals, the determined execution time intervals, during which the messages persist, being defined time periods occurring within a simulation time of the executable block diagram that starts with an execution start time and ends with an execution stop time of the block diagram;
adding a scenario block to the executable block diagram, the scenario block configured with one or more expected messages, and further configured to receive one or more actual messages generated by at least one of the message-based blocks in the block diagram;
executing, by a processor coupled to the memory, the block diagram;
comparing, by the scenario block, the one or more actual messages received by the scenario block with the one or more expected messages with which the scenario block is configured; and
generating, by the scenario block, an alert if the one or more actual messages are not equivalent to the one or more expected messages.

13. The computer-implemented method of claim 12 wherein the scenario block is configured with a plurality of expected messages and an expected order of the plurality of expected messages, the method further comprising:
generating the alert if an order of the actual messages is not equivalent to the expected order.

14. The computer-implemented method of claim 13 wherein the expected order is a sequential order.

15. The computer-implemented method of claim 12 wherein the scenario block is configured with a plurality of expected messages and an expected set of arrival times for the plurality of expected messages, the method further comprising:
generating the alert if one or more arrival times of the actual messages is not equivalent to the expected set of arrival times.

16. A computer-implemented method comprising:
accessing, from a memory, an executable block diagram, at least a portion of the executable block diagram having message-based semantics, the at least a portion of the executable block diagram
including a plurality of interconnected message-based blocks, where the message-based blocks send and receive messages during execution of the block diagram, the messages
including payloads that remain unchanged while the messages are exchanged between respective pairs of the interconnected message-based blocks, and
persisting for determined execution time intervals, the determined execution time intervals, during which the messages persist, being defined time periods occurring within a simulation time of the executable block diagram that starts with an execution start time and ends with an execution stop time of the block diagram;
adding a scenario block to the executable block diagram, the scenario block configured with one or more expected messages, and further configured to receive one or more actual messages generated by at least one of the message-based blocks in the block diagram;
executing, by a processor coupled to the memory, the block diagram;
comparing, by the scenario block, the one or more actual messages received by the scenario block with the one or more expected messages with which the scenario block is configured; and
if the one or more actual messages is not equivalent to the one or more expected messages, generating, by the scenario block, a trace of the one or more actual messages.

17. The computer-implemented method of claim 16 further comprising:
generating an additional scenario block, the additional scenario block configured with the one or more actual messages received by the scenario block; and
adding the additional scenario block to the executable block diagram.

18. One or more non-transitory computer-readable media comprising program instructions, the program instructions when executed by a processing element operable to:
access, from a memory, an executable model, at least a portion of the executable model having message-based execution semantics, the at least a portion of the executable model
including a plurality of interconnected message-based objects, where the message-based objects are configured to send and receive messages during execution of the model, the messages
including payloads that remain unchanged while the messages are exchanged between respective pairs of the interconnected message-based objects, and
persisting for determined model execution time intervals, the determined model execution time intervals, during which the messages persist, being defined time periods occurring within a simulation time of the executable model that starts with an execution start time and ends with an execution stop time of the model;
add an observer block to the model, the observer block configured to
observe one or more of the messages generated by the message-based objects, and
display information associated with the one or more messages being observed by the observer block during execution of the model;
execute, by a processor coupled to the memory, the model, producing the information; and
present, on a display coupled to the processor, the information associated with the one or more messages being observed by the observer block.

19. The one or more non-transitory computer-readable media of claim 18 wherein the information displayed by the observer block is at least one of:
an identifier of a message source object,
an identifier of one or more message destination objects,
a message payload,
a message type,
a time sent of a message, and
a time received of a message.

20. One or more non-transitory computer-readable media comprising program instructions, the program instructions when executed by a processing element operable to:
- access, from a memory, an executable model, at least a portion of the executable model having message-based execution semantics, the at least a portion of the executable model
  - including a plurality of interconnected message-based objects, where the message-based objects are configured to send and receive messages during execution of the model, the messages
    - including payloads that remain unchanged while the messages are exchanged between respective pairs of the interconnected message-based objects, and
    - persisting for determined model execution time intervals, the determined model execution time intervals, during which the messages persist, being defined time periods occurring within a simulation time of the executable model that starts with an execution start time and ends with an execution stop time of the model;
- add a message source block to the model, the message source block configured to generate one or more test messages at one or more predetermined times during execution of the model to verify at least a part of the model; and
- configure, by a processor coupled to the memory, one or more of the message-based objects of the model to receive the one or more test messages generated by the message source block during execution of the model.

21. The one or more non-transitory computer-readable media of claim 20 wherein the model represents a system and execution of the model simulates operation of the system.

22. The one or more non-transitory computer-readable media of claim 20 wherein the one or more message-based objects configured to receive the one or more test messages generated by the message source block execute in response to receiving the one or more test messages.

23. The one or more non-transitory computer-readable media of claim 22 wherein the one or more test messages include a predetermined payload including input data, the program instructions further operable to:
- process the input data included in the payload of the one or more test messages by the one or more message-based objects upon receiving the one or more test messages.

24. One or more non-transitory computer-readable media comprising program instructions, the program instructions when executed by a processing element operable to:
- access, from memory, an executable model, at least a portion of the executable model having message-based execution semantics, the at least a portion of the executable model
  - including a plurality of interconnected message-based objects, where the message-based objects are configured to send and receive messages during execution of the model, the messages
    - including payloads that remain fixed while the messages travel between respective pairs of the interconnected message-based objects, and
    - persisting for determined model execution time intervals, the determined model execution time intervals, during which the messages persist, being defined time periods that occur within a simulation time of the executable model that starts with an execution start time and ends with an execution stop time of the model;
- add a message sink block to the model, the message sink block configured to receive one or more messages generated by a selected one of the message-based objects of the model during execution of the model to verify at least a part of the model; and
- display, by a processor coupled to the memory, information from the one or more messages received by the message sink block during execution of the model.

25. One or more non-transitory computer-readable media comprising program instructions, the program instructions when executed by a processing element operable to:
- access, from a memory, an executable model, at least a portion of the executable model having message-based execution semantics, the at least a portion of the executable model
  - including a plurality of interconnected message-based objects, where the message-based objects are configured to send and receive messages during execution of the model, the messages
    - including payloads that remain unchanged while the messages are exchanged between respective pairs of the interconnected message-based objects, and
    - persisting for determined model execution time intervals, the determined model execution time intervals, during which the messages persist, being defined time periods occurring within a simulation time of the executable model that starts with an execution start time and ends with an execution stop time of the model;
- add, by a processor coupled to the memory, a scenario block to the model, the scenario block configured with one or more expected messages, and further configured to receive one or more actual messages generated by at least one of the message-based objects in the model;
- compare, through execution of the scenario block by the processor, the one or more actual messages received by the scenario block with the one or more expected messages with which the scenario block is configured; and
- generate, through execution of the scenario block by the processor, an alert if the one or more actual messages is different from the one or more expected messages.

26. The one or more non-transitory computer-readable media of claim 25 wherein the scenario block is configured with a plurality of expected messages and an expected order of the plurality of expected messages, the one or more non-transitory computer-readable media further comprising program instructions to:
- generate the alert if an order of the actual messages is not equivalent to the expected order.

27. The one or more non-transitory computer-readable media of claim 25 wherein a difference between the one or more actual messages and the one or more expected messages is at least one of:
- a value of the payload of the one or more actual messages;
- a type of message; and
- a time of generation of the one or more actual messages.

28. An apparatus comprising:
- a memory including an executable model, at least a portion of the executable model having message-based execution semantics, the at least a portion of the executable model
  - including a plurality of interconnected message-based objects, the message-based objects configured to send and receive messages during execution of the model, the messages including payloads that remain unchanged while the messages are exchanged between respective pairs of the interconnected message-based objects, and persisting for determined model execution time intervals, the determined model execution time intervals, during which the messages persist, being defined time periods occurring within a simulation time of the executable model that starts with an execution start time and ends with an execution stop time of the executable model; and a processor coupled to the memory, the processor configured to:

add an observer block to the executable model, the observer block configured to observe one or more of the messages generated by the message-based objects, and display information from the one or more messages being observed by the observer block during execution of the model.

29. The apparatus of claim 28 wherein the displayed information is one or more of:

an identifier of a message source block,
an identifier of one or more message destination blocks,
a message payload,
a message type,
a time sent of a message, and
a time received of a message.

30. An apparatus comprising:

a memory including an executable model, at least a portion of the executable model having message-based execution semantics, the at least a portion of the executable model including a plurality of interconnected message-based objects, the message-based objects configured to send and receive messages during execution of the model, the messages including payloads that remain fixed while the messages travel between respective pairs of the interconnected message-based objects, and persisting for determined model execution time intervals, the determined model execution time intervals, during which the messages persist, being defined time periods occurring within a simulation time of the executable model that starts with an execution start time and ends with an execution stop time of the model; and a processor coupled to the memory, the processor configured to:

add a message source block to the model, the message source block configured to generate one or more test messages at one or more predetermined times during execution of the model to verify at least a part of the model; and configure one or more of the message-based objects of the model to receive the one or more test messages generated by the message source block during execution of the model.

31. The apparatus of claim 30 wherein the one or more message-based objects configured to receive the one or more test messages generated by the message source block execute in response to receiving the one or more test messages.

32. The apparatus of claim 31 wherein the one or more test messages include a predetermined payload including input data, the processor further configured to:

process the input data included in the payload of the one or more test messages by the one or more message-based objects upon receiving the one or more test messages.

33. An apparatus comprising:

a memory including an executable model, at least a portion of the executable model having message-based execution semantics, the at least a portion of the executable model including a plurality of interconnected message-based blocks, the message-based blocks configured to send and receive messages during execution of the model, the messages including payloads that remain fixed while the messages travel between respective pairs of the interconnected message-based blocks, and persisting for determined model execution time intervals, the determined model execution time intervals, during which the messages persist, being defined time periods occurring within a simulation time of the executable model that starts with an execution start time and ends with an execution stop time of the model; and a processor coupled to the memory, the processor configured to:

add a scenario block to the model, the scenario block configured with one or more expected messages, and further configured to receive one or more actual messages generated by at least one of the message-based blocks during execution of the model;

compare the one or more actual messages received by the scenario block during execution of the model with the one or more expected messages with which the scenario block is configured; and if the one or more actual messages is not equivalent to the one or more expected messages, generate a trace of the one or more actual messages.

34. The apparatus of claim 33 wherein the scenario block is configured with a plurality of expected messages and an expected order of the plurality of expected messages, the processor further configured to:

generate an alert if an order of the actual messages is not equivalent to the expected order.

35. The apparatus of claim 33 wherein the scenario block is configured with a plurality of expected messages and an expected set of arrival times for the plurality of expected messages, the processor further configured to:

generate an alert if one or more arrival times of the actual messages is not equivalent to the expected set of arrival times.

* * * * *